(12) United States Patent
Ebina et al.

(10) Patent No.: US 7,799,395 B2
(45) Date of Patent: Sep. 21, 2010

(54) CLAY FILM

(75) Inventors: Takeo Ebina, Sendai (JP); Fujio Mizukami, Sendai (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 845 days.

(21) Appl. No.: 10/571,107

(22) PCT Filed: Sep. 8, 2004

(86) PCT No.: PCT/JP2004/013077

§ 371 (c)(1), (2), (4) Date: Mar. 8, 2006

(87) PCT Pub. No.: WO2005/023714

PCT Pub. Date: Mar. 17, 2005

(65) Prior Publication Data

US 2007/0027248 A1    Feb. 1, 2007

(30) Foreign Application Priority Data

| Sep. 8, 2003 | (JP) | ............................ 2003-315780 |
|---|---|---|
| Sep. 16, 2003 | (JP) | ............................ 2003-322644 |
| Sep. 29, 2003 | (JP) | ............................ 2003-338378 |
| Dec. 17, 2003 | (JP) | ............................ 2003-420028 |
| Mar. 31, 2004 | (JP) | ............................ 2004-106756 |
| Aug. 10, 2004 | (JP) | ............................ 2004-232919 |
| Aug. 10, 2004 | (JP) | ............................ 2004-232950 |
| Aug. 10, 2004 | (JP) | ............................ 2004-232964 |
| Aug. 10, 2004 | (JP) | ............................ 2004-232983 |
| Aug. 10, 2004 | (JP) | ............................ 2004-233680 |
| Aug. 10, 2004 | (JP) | ............................ 2004-233892 |
| Aug. 10, 2004 | (JP) | ............................ 2004-233898 |

(51) Int. Cl.
*B32B 27/08*    (2006.01)

(52) U.S. Cl. ..................... 428/35.1; 428/36.6; 428/36.7

(58) Field of Classification Search ....................... None
See application file for complete search history.

(56) References Cited

U.S. PATENT DOCUMENTS 3,506,477 A * 4/1970 Desaulniers et al. ......... 428/215

(Continued)

FOREIGN PATENT DOCUMENTS

JP    51-7056    1/1976

(Continued)

OTHER PUBLICATIONS

Ebina et al. "Smectite Haikomaku no Tosui Keisu Sokutei", CSJ: The Chemical Society of Japan Dai 83, Shunki Nenkai-Koen Yokoshu I, p. 200, 2003.*

(Continued)

*Primary Examiner*—Timothy M Speer
(74) *Attorney, Agent, or Firm*—Oblon, Spivak, McClelland, Maier & Neustadt, L.L.P.

(57) ABSTRACT

The present invention provides a clay film with excellent flexibility, whose main component is natural clay or synthetic clay, and in which there is uniform orientation in the clay particle layer, and relates to a novel clay film that has enough mechanical strength to be used as a self-supporting film, and has a structure in which layers of clay particles are highly oriented, and in which the main constituent component of the clay film is mica, vermiculite, montmorillonite, iron montmorillonite, beidellite, saponite, hectorite, stevensite, or nontronite, and which has excellent flexibility, undergoes no structural change at high temperatures of 250° C. and up to 600° C., contains no pinholes, and has a gas permeation coefficient of less than $3.2 \times 10^{-11}$ $cm^2 s^{-1} cmHg^{-1}$ at room temperature for helium, hydrogen, oxygen, nitrogen, or air.

23 Claims, 27 Drawing Sheets

U.S. PATENT DOCUMENTS

| | | | | |
|---|---|---|---|---|
| 5,552,469 | A | * | 9/1996 | Beall et al. .................. 524/445 |
| 5,840,795 | A | * | 11/1998 | Freeman et al. ............. 524/447 |
| 6,358,576 | B1 | * | 3/2002 | Adur et al. .................. 428/34.2 |
| 2003/0176537 | A1 | * | 9/2003 | Chaiko ....................... 523/200 |

FOREIGN PATENT DOCUMENTS

| | | |
|---|---|---|
| JP | 52-15807 | 2/1977 |
| JP | 61-3767 | 2/1986 |
| JP | 63-64913 | 3/1988 |
| JP | 5-254824 | 10/1993 |
| JP | 6-95290 | 4/1994 |
| JP | 6-84435 | 10/1994 |
| JP | 7-17371 | 3/1995 |
| JP | 7-251489 | 10/1995 |
| JP | 10-231434 | 9/1998 |
| JP | 2001-526313 | 12/2001 |
| JP | 2002-030255 | 1/2002 |
| JP | 2002-293984 | 10/2002 |

OTHER PUBLICATIONS

Yano et al. "Synthesis and Properties of Polyimide-Clay Hybrid", J. Polymer Science, vol. 31, pp. 2493-2498, 1993.*

Earnest, C.M. "Thermal Analysis of Selected Illite and Smectite Clay Minerals. Part II. Smectite Clay Minerals", Thermal Analysis in the Geosciences, vol. 38, pp. 288-312, Springer Berlin, 1991.*

"Additve". Lewis, Richard J., Sr. (2002). Hawley's Condensed Chemical Dictionary (14th Edition).. John Wiley & Sons. Online version available at: http://knovel.com/web/portal/browse/display?_EXT_KNOVEL_DISPLAY_bookid=704&VerticalID=0.*

U.S. Appl. No. 11/997,355, filed Jan. 30, 2008, Ebina, et al.

U.S. Appl. No. 12/029,203, filed Feb. 11, 2008, Ebina, et al.

Takeo Ebina, et al., "Preparation and Gas Impermeability of Self-Supported Highly Oriented Silicate Films", The Chemical Society of Japan 84$^{th}$ Annual Spring Conference Lecture Summary, Mar. 28, 2004, 3 pages (with English Translation).

Takeo Ebina, et al., "Hydraulic Conductivity of Highly Oriented Smectite Membrane", The Chemical Society of Japan 83$^{rd}$ Annual Spring Conference, Mar. 18-21, 2003, 5 Pages (with English Translation).

Ebina, Takeo et al., "Smectite Haikomaku no Tosui Keisu Sokutei", CSJ: The Chemical Society of Japan Dai 83 Shunki Nenkai-Koen Yokoshu I, p. 200, 2003.

Shiramizu, H. et al. "Clay Mineralogy—Basics of Clay Science", Asakura Shoten, pp. 57-58, 1998.

Umemura, Yasushi et al., "Preparation of Methylene Blue-Clay Hybrid Films by a Modified Langmuir-Blodgett Method and Molecular Orientation of Methylene Blue in the Film", vol. 42, No. 4, pp. 218-222, 2003.

U.S. Appl. No. 11/721,403, filed Jun. 11, 2007, Ebina, et al.

* cited by examiner

CLAY FILM

TECHNICAL FIELD

The present invention relates to a novel clay film that has enough mechanical strength to be used as a self-supporting film (self-standing film), and has highly oriented layers of clay particles. The present invention also relates to a composite clay film, in which a functional component is uniformly distributed in the gaps between the clay film particles, and which has enough mechanical strength to be used as a self-supporting film, and which has highly oriented layers of clay particles. The present invention also relates to a gas blocking material and a protective film that have enough mechanical strength to be used as a self-supporting film, and have highly oriented layers of clay particles.

BACKGROUND ART

Many different production processes that involve high temperature conditions are commonly used in a wide range of chemical industry fields. The leakage of liquids and gases from the pipe joints in these production lines is prevented by gaskets, welding, and so forth. Up to now, gaskets with excellent flexibility have been made from organic polymer materials, for example. Unfortunately, these materials do not have high heat resistance, with the highest being about 350° C. with an imide resin, so metal gaskets have to be used at higher temperatures, but a problem is that these metal gaskets are not as flexible as those made from organic polymer materials.

Aluminum foils and vapor deposited aluminum films do offer high gas barrier performance, but they are not transparent. Also, since an aluminum foil is a metal, it cannot be used as a sealing material to be wrapped around a threaded component. Vapor deposited silica films are transparent and have excellent gas barrier performance, but because the material that serves as a base in these vapor deposited silica films is an organic compound film, once again these films cannot be used under high temperature conditions over 350° C. In addition to being used as gaskets, these gas blocking materials are sometimes used by being wrapped around joint threads, wrapped around a tube, or stuck onto a flat member.

Enzymes such as glucose oxidase are generally useful as biocatalysts, have extremely high selectivity, and have the characteristic of specifically conducting a reaction, but a drawback is their poor heat resistance. However, it is known that the thermal stability of organic materials is generally quite high when they are enclosed in an inorganic material. In view of this, there have been a number of attempts at improving the thermal stability of these enzymes by enclosing them in an inorganic material, for example.

Nylon resins are widely used as molding materials because of their excellent strength and wear resistance, but they also have a low thermal deformation temperature, have poor dimensional stability after absorbing moisture, and shrink considerably in molding, among other drawbacks. Therefore, there has been research into adding clay as a filler in an effort to raise the thermal deformation temperature, increase dimensional stability during moisture absorption, and reduce molding shrinkage. One nylon resin composition that has been proposed contains a mixture of 35 to 80 wt % nylon resin, 20 to 65 wt % of one or more fillers selected from among talc, calcium metasilicate, calcined clay, and silica, and 1 to 10 wt % glass fiber, with this mixture being pelletized in an extruder (Japanese Laid-Open Patent Application S51-7056). In this case, however, a problem is that it is difficult to blend the nylon resin with the filler and glass fiber if the nylon resin accounts for less than 35 wt %.

A method that has been developed for manufacturing a clay mineral and nylon composite with excellent rigidity and impact resistance involves using a fibrous clay mineral such as sepiolite or palygorskite in a proportion of 1 to 30 weight parts (as solids) per 100 weight parts of nylon monomer (Japanese Patent Publication H6-84435). In this case, however, a problem is that if the amount of fibrous clay mineral is over 30 weight parts, there is less contact between the nylon monomer particles, and the molecular weight of the nylon is lower. These methods were mainly developed with an eye to enhancing the characteristics of nylon, and the proportion of the total weight of the material accounted for by the clay mineral is 65% or less.

Meanwhile, clay thin films have been produced up to now using the Langmuir-Blodgett method (H. Shiramizu, "Clay Mineralogy—Basics of Clay Science," Asakura Shoten, p. 57 (1988)). However, this method involved forming a clay thin film on the surface of a substrate made from glass or another such material, and a clay thin film that was strong enough to be self-supporting could not be obtained. There have also been reports of various methods for preparing functional clay thin films and the like. For instance, there is a method for manufacturing a clay thin film in which an aqueous dispersion of a hydrotalcite-based interlayer compound is made into a thin film and dried (Japanese Laid-Open Patent Application H6-95290), a method for manufacturing a laminar clay mineral thin film in which the bond structure of a laminar clay mineral is oriented and fixed by performing a heat treatment that promotes a reaction between the laminar clay mineral and phosphoric acid or phosphoric acid groups (Japanese Laid-Open Patent Application H5-254824), and an aqueous composition for a coating treatment, containing a complex compound of a divalent or higher metal and a smectite-based clay mineral (Japanese Laid-Open Patent Application 2002-30255), to name just a few of the many extant examples. Nevertheless, there are no cases of the development of a clay oriented thin film that has enough mechanical strength to be used as a self-supporting film, and in which layers of clay particles is highly oriented.

Also, it is known that a film with uniform particle orientation can be formed by dispersing clay in water or an alcohol, spreading out this dispersion over a glass sheet, and leaving it to dry, and oriented samples for use in X-ray analysis have been prepared (Y. Umezawa, *Nendo Kagaku*, Vol. 42, No. 4, 218-222 (2003)). However, when a film is formed on a glass sheet, it is difficult to peel the clay film away from the glass because cracks develop in the film during peeling, for example, so it has been difficult to obtain a self-supporting film. Also, even if the film can be peeled off, the resulting film is brittle and lacking in strength, and there has been no method for preparing a film that is uniform in thickness and free of pinholes. Accordingly, clay thin films have not as yet been applied as self-supporting films.

Also, polymers that are soluble in water are used as molding materials, and are also added as a dispersant, thickener, or binder to an inorganic material and used as a gas barrier material. For instance, a composition is formed from 1 to 10 weight parts of a clay mineral or other inorganic laminar compound and 100 weight parts of a mixture of (A) a highly hydrogen-bondable resin containing two or more carboxyl groups per molecule and (B) a highly hydrogen-bondable resin containing two or more hydroxyl groups in its molecular chain, where the weight ratio A/B=80/20 to 60/40, molding a film with a thickness of 0.1 to 50 µm from this composition, and subjected this film to heat treatment and electron beam treatment, the result of which is that this film has gas barrier properties (Japanese Laid-Open Patent Application H10-231434). In this case, however, a problem is that the main component is a water-soluble polymer resin, so heat resistance is not very high.

Also, a laminated film that has excellent moisture resistance and gas barrier property and is suited to food packaging can be obtained by laminating a layer composed of a resin composition containing a resin and an inorganic laminar compound between two polyolefin-based resin layers (Japanese Laid-Open Patent Application H7-251489). In this case, however, the layer of resin composition containing an inorganic laminar compound is used as part of a multilayer film, and not alone as a self-supporting film. Also, the volumetric ratio of this resin composition (an inorganic laminar compound/resin) is specified as being between 5/95 and 90/10, with the resin contained in an amount of at least 10%.

So far there has been no film that had enough mechanical strength to be used as a self-supporting film and in which layers of clay particles were highly oriented. Meanwhile, in the cosmetic and pharmaceutical fields, there have been proposals for a favorable spherical, organic, composite clay mineral (Japanese Laid-Open Patent Application S63-64913 and Japanese Patent Publication H07-17371), the manufacture of a drug for treating wet athlete's foot, comprising a mixture of a clay mineral, an acid, and an enzyme (Japanese Laid-Open Patent Application S52-15807 and Japanese Patent Publication S61-03767), and so forth in which clay and an organic compound were compounded. Nevertheless, it is a fact that these organic composite clay minerals have yet to be used as self-supporting films, and there is an urgent need in this field of technology for the development and practical application of a novel clay thin film having enough mechanical strength to be used as a self-supporting film.

DISCLOSURE OF THE INVENTION

It is an object of the present invention to provide a novel material composed of an oriented clay film that has excellent flexibility under high temperature conditions over 350° C., and that has excellent barrier properties against gases and liquids.

It is an object of the present invention to provide a novel composite clay film and glucose oxidation catalyst having heat-resistant glucose oxidation catalysis performance.

It is an object of the present invention to provide a flexible, oriented self-supporting clay film that contains a polyhydric phenol, with this polyhydric phenol being uniformly distributed in a thin film, and that has excellent thermal stability.

It is an object of the present invention to provide a flexible, oriented self-supporting clay film that contains nylon, with this nylon being uniformly distributed in a thin film, and that has excellent thermal stability.

It is an object of the present invention to provide a water-soluble polymer clay film that has excellent thermal stability and is a flexible, oriented self-supporting clay film.

It is an object of the present invention to provide a strip of clay film in many different forms.

It is an object of the present invention to provide a flexible gas blocking material in which clay is oriented and densely laminated, which affords enough mechanical strength to be used as a self-supporting film, optical transmissivity, and excellent thermal stability.

It is an object of the present invention to provide a novel protective film composed of an oriented clay film that has excellent flexibility under high temperature conditions over 350° C., and which has excellent barrier properties against gases and liquids.

The present invention which solves the above-mentioned problems will now be described in detail.

The present invention is a clay film made up of a main component of clay, or clay and a small amount of additive, or clay and a small amount of additive and a functional component, having a structure in which layers of clay particles are highly oriented, having enough mechanical strength and flexibility to be used as a self-supporting film, and having a gas permeation coefficient of less than $3.2 \times 10^{-11}$ $cm^2s^{-1}cmHg^{-1}$. In the present invention, the main constituent component of the clay film is natural clay or synthetic clay, and the main constituent component of the clay film is one or more components selected from the group comprising mica, vermiculite, montmorillonite, iron montmorillonite, beidellite, saponite, hectorite, stevensite, and nontronite. Also, in the present invention, the additive is one or more types selected from the compound group comprising epsilon-caprolactam, dextrin, chitosan, starch, cellulose resin, gelatin, agar-agar, wheat flour, gluten, alkyd resin, polyurethane resin, epoxy resin, fluororesin, acrylic resin, methacrylic resin, phenol resin, polyamide resin, polyester resin, polyimide resin, polyvinyl resin, polyethylene glycol, polyacrylamide, polyethylene oxide, protein, deoxyribonucleic acid, ribonucleic acid, polyamino acid, phenols, and benzoic acids. The weight proportion of the additive versus the total solids is not more than 30%.

The clay film of the present invention has any two-dimensional planar shape, such as circular, square, or rectangular, and can be used as a self-supporting film. The thickness of the clay film is less than 1 mm and the surface area is greater than 1 $cm^2$. With the clay film of the present invention, the flexibility is excellent, there is no structural change at high temperatures of over 250° C. and up to 600° C., and there are no pinholes. The gas permeation coefficient is less than $3.2 \times 10^{-11}$ $cm^2s^{-1}cmHg^{-1}$ at room temperature for helium, hydrogen, oxygen, nitrogen, or air. The gas permeation coefficient is less than $3.2 \times 10^{-11}$ $cm^2s^{-1}cmHg^{-1}$ at room temperature for helium, hydrogen, oxygen, nitrogen, or air after 24 hours of heat treatment at 600° C. The water permeation coefficient is not more than $2 \times 10^{-10}$ $cm \; s^{-1}$ at room temperature.

This clay film is characterized in that it is a self-supporting film, is flexible, easy to work, and easy to add functions to, has a thickness of 3 to 30 μm, for example, and is highly oriented, with orientation on the micrometer or nanometer order. As to the basic functions of this clay film, its gas barrier performance with helium is under the detectable limit (equivalent to aluminum foil), its moisture permeability is 500 g/m²/day (equivalent to cellophane), its heat resistance is 1000° C. without an additional film and 600° C. with an additional film, its tensile strength is equivalent to that of low-density polyethylene, its water resistance is such that it will not swell when soaked in water (water-resistant), its water blocking is such that the water permeation coefficient is $2 \times 10^{-10}$ cm/sec or less, and its optical transmissivity is such that at least 85% of visible light (500 nm) can be transmitted. The gas permeability of this clay film is 1/5 at a clay/polymer ratio of 5/95, and 1/2400 at 95/5, if we let the gas permeability be 1 at 0/100. With this clay film, particularly high gas barrier performance can be obtained by raising the proportion of the main component clay.

With the present invention, the optical transmissivity of the clay film can be adjusted to 85% or higher, for example, according to how much visible light (500 nm) transmissivity is needed.

The clay film of the present invention itself makes use of a laminar silicate as its main raw material (90 wt % and up), and the basic structure is preferably made up of at least 90 wt % natural or synthetic, swellable, laminar silicate with a layer thickness of approximately 1 nm, a particle size up to 1 μm, and an aspect ratio of up to about 300, and up to 10 wt % natural or synthetic, low- or high-molecular weight additives with a molecule size of up to a few nanometers, for example. This clay film is produced by stacking laminar crystals with a thickness of approximately 1 nm, with the crystals oriented in the same direction, and densely laminating these. The clay film thus obtained has a thickness of 3 to 100 μm, and preferably 3 to 30 μm, its gas barrier performance is such that the oxygen permeability at a thickness of 30 μm is less than 0.1 $cc/m^2 \cdot 24$ hr·atm, its water permeability is less than 0.1 $cc/m^2 \cdot 24$ hr·atm, its water blocking is such that the water permeation coefficient is $2 \times 10^{-10}$ cm/sec or less, its optical transmissivity is such that at least 75% of visible light (500 nm) is transmitted, for example, its surface area can be increased to at least 100×40 cm, and its heat resistance is high, with no decrease in gas barrier performance is seen after 24 hours of heat treatment at 600° C.

The clay film of the present invention can be easily cut with scissors, a cutter, or the like to the desired size and shape, such as circular, square, or rectangular. The clay film of the present invention preferably has a thickness of less than 1 mm and a surface area greater than 1 $cm^2$. Favorable examples of the main constituent component of the clay film include mica, vermiculite, montmorillonite, iron montmorillonite, beidellite, saponite, hectorite, stevensite, and nontronite. Also, the clay film of the present invention is characterized in that the layers of clay particles are highly oriented, and there are no pinholes, and is characterized in that flexibility is excellent and there is no structural change at high temperatures of over 250° C. and up to 600° C. The clay film of the present invention is also characterized in that can be used as a self-supporting film, can be used under high temperature conditions over 250° C., has excellent flexibility, is a solid material with no pinholes, and has excellent gas barrier properties against gases and liquids.

With the present invention, a clay film can be obtained as a self-supporting film by preparing a uniform, dilute clay aqueous dispersion, allowing this dispersion to stand horizontally so that the clay particles gradually precipitate, separating the liquid (the dispersion medium) by any of various solid-liquid separation methods, such as centrifugation, filtration, vacuum drying, freeze vacuum drying, and heating evaporation, then forming this product into a film, and peeling the film away from its support, and by employing manufacturing conditions here which will yield enough strength for the film to be used as a self-supporting film of uniform thickness.

With the present invention, the clay can be either natural or synthetic smectite, or a mixture of these, which is added to water or to a liquid whose main component is water, so as to prepare a dilute, uniform clay dispersion. The concentration of the clay dispersion is preferably from 0.5 to 10 wt %, and even more preferably from 1 to 3 wt %. If the concentration of the clay dispersion here is too low, drying will take too long. If the concentration of the clay dispersion is too high, though, the clay will not disperse well and a uniform film cannot be obtained. This clay dispersion is then allowed to stand horizontally so that the clay particles gradually precipitate, and the liquid (the dispersion medium) is gradually evaporated off to form a film, for example. In this case, a dry clay film is preferably obtained by any of a variety of solid-liquid separation methods, favorable examples of which include centrifugation, filtration, vacuum drying, freeze vacuum drying, and heating evaporation, or a combination of these methods.

Of the above methods, when heating evaporation is used, for instance, the dispersion, which has been deaerated before being put under a vacuum, is poured into a flat tray, preferably one made of plastic or metal, and kept horizontal while it is dried for anywhere from 3 hours to about half a day, and preferably from 3 to 5 hours, under temperature conditions of 30 to 70° C., and preferably 40 to 50° C., in a forced-air oven, which gives a clay film. These drying conditions are set so as to be adequate for removing the liquid by evaporation. If the temperature is too low here, drying will take too long, but if the temperature is too high, convection will occur and there will be a decrease in the degree of orientation of the clay particles. If the clay film will not peel away from the tray naturally, it is preferably dried under temperature conditions of from 110 to 300° C., and even more preferably from 110 to 200° C., to facilitate peeling and obtain a self-supporting film. If the temperature here is too low, peeling will be difficult, but if the temperature is too high, the film will tend to crack during drying. In the present invention, "highly orienting the layers of clay particles" means stacking unit structure layers (thickness of approximately 1 nm) of clay particles so that the orientation of the layer plane is uniform, and imparting a high periodicity in the direction perpendicular to the layer plane. To obtain this orientation of the clay particles, a dilute, uniform clay dispersion is allowed to stand horizontally so that the clay particles gradually precipitate, and the liquid (the dispersion medium) is gradually evaporated off to form a film, for example.

The clay film of the present invention can be used as a gasket or the like with excellent flexibility under high temperature conditions over 350° C., for example, and can be utilized for preventing leaks in pipe joints along a production line, for example, in many applications in the chemical industry. Molecules of helium gas are smaller than those of any other gas, which means that blocking helium gas is the most difficult. This clay film exhibits good gas barrier performance not only against a variety of gases, namely, air, oxygen gas, nitrogen gas, and hydrogen gas, but also against helium gas. Therefore, this clay film is expected to have gas barrier properties against all gases, including organic gases. It is also possible to mold the clay film and use it as a protective film for a support without first peeling it from the support surface. This is an effective way to prevent corrosion and fouling of a support, or to increase its heat resistance. This protective film is particularly effective at blocking oxygen gas, so it should be effective at preventing the oxidation of a support, and can be used, for example, to rustproof metal structural materials or metal joint components.

With the present invention, it is possible to obtain as a self-supporting film a composite clay film in which a functional component such as glucose oxidase is uniformly dispersed in the gaps between the particles of a clay thin film that has enough mechanical strength to be used as a self-supporting film and has highly oriented layers of clay particles.

With the present invention, it is possible to obtain as a self-supporting film a composite clay film in which a functional component such as glucose oxidase is uniformly dispersed in the gaps between the particles of a clay film that has highly oriented layers of clay particles by preparing a uniform, dilute clay glucose oxidase aqueous dispersion, allowing this dispersion to stand horizontally so that the clay particles gradually precipitate, separating the liquid (the dispersion medium) by any of various solid-liquid separation methods, such as centrifugation, filtration, vacuum drying, freeze vacuum drying, and heating evaporation, then forming this product into a film, and peeling the film away from its support, and by employing manufacturing conditions here which will yield enough strength for the film to be used as a self-supporting film of uniform thickness.

With the present invention, the clay can be either natural or synthetic, and is preferably either natural or synthetic smectite, or a mixture of these, which is added to water or to a liquid whose main component is water, so as to prepare a dilute, uniform dispersion. The concentration of the clay dispersion is preferably from 0.5 to 10 wt %, and even more preferably from 1 to 3 wt %. Next, glucose oxidase powder is weighed out and added to the clay dispersion to prepare a uniform dispersion of glucose oxidase and clay. The proportion of glucose oxidase to the total solids is from 1 to 15%, and preferably from 5 to 10%. If the proportion of the glucose oxidase here is too low, the addition of the glucose oxidase will have no effect, but if the proportion of glucose oxidase is too high, the distribution of glucose oxidase and clay in the prepared film will not be uniform, so the effect of the addition will be diminished.

Then, this glucose oxidase clay dispersion is allowed to stand horizontally so that the clay particles gradually precipitate, and the liquid (the dispersion medium) is gradually evaporated off to form a film, for example. In this case, a dry clay film is preferably obtained by any of a variety of solid-liquid separation methods, favorable examples of which include centrifugation, filtration, vacuum drying, freeze vacuum drying, and heating evaporation, or a combination of these methods. Of these methods, when heating evaporation is used, for instance, the dispersion, which has been deaerated before being put under a vacuum, is poured into a flat tray, preferably one made of plastic or metal, and kept horizontal while it is dried for anywhere from 3 hours to about half a day, and preferably from 3 to 5 hours, under temperature conditions of 30 to 70° C., and preferably 30 to 50° C., in a forced-air oven, which gives a clay film. If the dispersion is not deaerated first, undesirable pores originating in bubbles will tend to form in the clay film.

The above-mentioned composite clay film of the present invention is characterized in that can be used as a glucose oxidation catalyst having heat resistance, has excellent flexibility, is a solid material having no pinholes, and has excellent barrier properties. Therefore, the composite clay film of the present invention can be used in a wide range of applications as a self-supporting film with excellent flexibility under high temperature conditions. For example, it can be used as a heat-resistant member with good barrier properties, such as a gasket for pipe joints in a production line in the chemical industry, or a similar type of product.

The thermal stability of the glucose oxidase in the composite clay film of the present invention is markedly improved by the above compounding, so it is expected that this film will also find use as a heat-resistant enzyme catalyst. The significance of the glucose oxidase being present in the gaps between the clay particles, rather than between clay layers, is that the glucose oxidase fills the gaps between the clay particles and serves to bind the clay particles together. Accordingly, the addition of glucose oxidase reduces cracking the composite clay film, and this yields a clay thin film having excellent characteristics that can be used as a self-supporting film.

The present invention provides, for example, a composite clay film in which a polyhydric phenol is uniformly distributed within a clay thin film that has enough mechanical strength to be used as a self-supporting film and has highly oriented layers of clay particles.

Examples of polyhydric phenols include hydroquinone, resorcinol, pyrocatechol, pyrogallol, and phloroglucin.

The significance of the polyhydric phenol being uniformly distributed within the clay thin film is that the polyhydric phenol molecules are chemically bonded by dehydration condensation during heating, but if the polyhydric phenol is uniformly distributed within the clay thin film, the network of chemical bonds of the phenol can spread out more evenly within the clay film, so a thin film is obtained with excellent strength and flexibility. Accordingly, the addition of the polyhydric phenol makes it less likely that the composite clay film will be easily torn by being pulled, twisted, etc., and this means that the resulting composite clay film will have excellent characteristics and can be used as a self-supporting film.

With the present invention, a composite clay film in which a polyhydric phenol is uniformly distributed in a clay thin film that has highly oriented layers of clay particles can be obtained as a self-supporting film by preparing a uniform, dilute aqueous dispersion containing clay and polyhydric phenol, allowing this dispersion to stand horizontally so that the clay particles gradually precipitate, separating the liquid (the dispersion medium) by any of various solid-liquid separation methods, such as centrifugation, filtration, vacuum drying, freeze vacuum drying, and heating evaporation, then forming this product into a film, and peeling the film away from its support, and by employing manufacturing conditions here which will yield enough strength for the film to be used as a self-supporting film of uniform thickness.

The polyhydric phenol can be a commercially available reagent, such as pyrocatechol, resorcin (resorcinol), or hydroquinone having two hydroxyl groups, or phloroglucin or pyrogallol having three hydroxyl groups. Because these have a plurality of hydroxyl groups, they readily dissolved in water, and can be uniformly dissolved in an aqueous dispersion. Also, since their evaporation pressure is low, even if they are heated somewhat, they will not volatilize and be lost from the film. Another anticipated effect is that these will polymerize and strengthen the laminar structure of the clay particles through a dehydration condensation reaction resulting from heat treatment.

With the present invention, the clay can be either natural or synthetic, and is preferably either natural or synthetic smectite, or a mixture of these, which is added to water or to a liquid whose main component is water, so as to prepare a dilute, uniform dispersion. The concentration of the clay dispersion is preferably from 0.5 to 10 wt %, and even more preferably from 1 to 3 wt %. Next, a polyhydric phenol powder is weighed out and added to the clay dispersion to prepare a uniform dispersion of polyhydric phenol and clay. The proportion of polyhydric phenol to the total solids is from 1 to 30%, and preferably from 5 to 20%. If the proportion of the polyhydric phenol here is too low, the addition of the polyhydric phenol will have no effect, but if the proportion of polyhydric phenol is too high, the distribution of polyhydric phenol and clay in the prepared film will not be uniform, so the effect of the addition will be diminished.

The present invention also provides, for example, a composite clay film in which nylon is uniformly distributed in a composite clay film that has enough mechanical strength to be used as a self-supporting film and has highly oriented layers of clay particles.

With the present invention, a composite clay film in which nylon is uniformly distributed in a clay thin film that has highly oriented layers of clay particles can be obtained as a self-supporting film by preparing a uniform, dilute aqueous dispersion containing clay and nylon, allowing this dispersion to stand horizontally so that the clay particles gradually precipitate, separating the liquid (the dispersion medium) by any of various solid-liquid separation methods, such as centrifugation, filtration, vacuum drying, freeze vacuum drying, and heating evaporation, then forming this product into a film, and peeling the film away from its support, and by employing manufacturing conditions here which will yield enough strength for the film to be used as a self-supporting film of uniform thickness.

With the present invention, the clay can be either natural or synthetic, and is preferably either natural or synthetic smectite, or a mixture of these, which is added to water or to a liquid whose main component is water, so as to prepare a dilute, uniform dispersion.

Next, a nylon monomer powder is weighed out and added to the clay dispersion to prepare a uniform dispersion of nylon monomer and clay. The proportion of nylon to the total solids is from 1 to 30%, and preferably from 5 to 20%. If the proportion of the nylon monomer here is too low, the addition of the nylon monomer will have no effect, but if the proportion of nylon monomer is too high, the distribution of nylon monomer and clay in the prepared film will not be uniform, so the effect of the addition will be diminished.

Then, this nylon monomer clay dispersion is allowed to stand horizontally so that the clay particles gradually precipitate, and the liquid (the dispersion medium) is gradually evaporated off to form a film, for example. Preferably, a dry clay film is obtained by any of a variety of solid-liquid separation methods, favorable examples of which include centrifugation, filtration, vacuum drying, freeze vacuum drying, and heating evaporation, or a combination of these methods. Of these methods, when heating evaporation is used, for instance, the dispersion, which has been deaerated before being put under a vacuum, is poured into a flat tray, preferably one made of plastic or metal, and kept horizontal while it is dried for anywhere from 3 hours to about half a day, and preferably from 3 to 5 hours, under temperature conditions of 30 to 70° C., and preferably 30 to 50° C., in a forced-air oven, which gives a clay film.

The above-mentioned composite clay film is subjected to a polymerization treatment for approximately 1 hour or longer, and preferably for approximately 5 hours, by being heated at between 250 and 270° C., to polymerize the nylon monomer. If the temperature here is too low, the polymerization will not progress completely, but if the temperature is too high, the nylon will tend to deteriorate. With the present invention, the above steps of drying and heat treatment can be performed simultaneously or overlapping in time so as to achieve the intended object.

The composite clay film of the present invention can be used in a wide range of applications as a self-supporting film with excellent flexibility under high temperature conditions. For instance, it can be used as a member with high barrier performance and heat resistance, such as a gasket for pipe joints along a production line in the chemical industry, or a similar product. The significance of nylon being uniformly distributed within the clay thin film is that the during heat treatment the nylon monomer molecules form chemical bonds through ring cleavage polymerization, but if the nylon monomer is uniformly distributed in the clay thin film in the course of this, then the network of chemical bonds of the nylon can spread out more evenly within the clay film, so a thin film is obtained with excellent strength and flexibility. Accordingly, the addition of the nylon monomer makes it less likely that the composite clay film will be easily torn by being pulled, twisted, etc., and this means that the resulting clay thin film will have excellent characteristics and can be used as a self-supporting film.

The present invention also provides a water-soluble polymer composite clay film that has enough mechanical strength to be used as a self-supporting film, and in which the clay particles are highly oriented, and a water-soluble polymer is uniformly distributed within a laminated clay film. Examples of this water-soluble polymer include one or more types selected from among dextrin, starch, cellulose resin, gelatin, agar-agar, wheat flour, gluten, alkyd resin, polyurethane resin, epoxy resin, fluororesin, acrylic resin, methacrylic resin, phenol resin, polyamide resin, polyester resin, imide resin, polyvinyl resin, polyethylene glycol, polyacrylamide, polyethylene oxide, protein, deoxyribonucleic acid, ribonucleic acid, and polyamino acid. The weight ratio of water-soluble polymer to the total solids is 10% or less.

The water-soluble polymer used in the present invention has a polar group on its main chain or a side chain, and is therefore hydrophilic, and while there are no particular restrictions on this polymer so long as it is soluble in water, favorable examples include one or more types selected from among dextrin, starch, cellulose resin, gelatin, agar-agar, wheat flour, gluten, alkyd resin, polyurethane resin, epoxy resin, fluororesin, acrylic resin, methacrylic resin, phenol resin, polyamide resin, polyester resin, imide resin, polyvinyl resin, polyethylene glycol, polyacrylamide, polyethylene oxide, protein, deoxyribonucleic acid, ribonucleic acid, and polyamino acid. The smectite or other clay used in the present invention is also hydrophilic, and disperses well in water. The water-soluble polymer and clay have affinity with each other, and when they are mixed in water they readily bond and form a compound.

The clay film of the present invention can be used as a self-supporting film, can be used under high temperature conditions over 350° C., has excellent flexibility, is a solid material that is free of pinholes, and has excellent barrier properties. Therefore, the clay film of the present invention can be used in a wide range of applications as a gasket or separator with excellent flexibility under high temperature conditions over 250° C., and can be used to prevent leaks in pipe joints along a production line in many fields of the chemical industry, as a diaphragm in batteries and electrolysis apparatus, and so forth.

The present invention provides, for example, a gas blocking material made from a film whose main constituent component is clay, this gas blocking material 1) being constituted by clay alone or by clay and an additive, 2) having a weight ratio of clay to total solids of over 90%, 3) having gas barrier properties, and 4) having enough mechanical strength to be used as a self-supporting film.

The clay used in the present invention can be either natural or synthetic, and is preferably one or more components selected from among mica, vermiculite, montmorillonite, iron montmorillonite, beidellite, saponite, hectorite, stevensite, and nontronite. Even more preferably, it is either natural or synthetic smectite, or a mixture of these. The water-soluble polymer used in the present invention has a polar group on its main chain or a side chain, and is therefore hydrophilic, or is cationic or anionic, and while there are no particular restrictions on this polymer so long as it is soluble in water, favorable examples include one or more types selected from among epsilon-caprolactam, dextrin, starch, cellulose resin, gelatin, agar-agar, wheat flour, gluten, alkyd resin, polyurethane resin, epoxy resin, fluororesin, acrylic resin, methacrylic resin, phenol resin, polyamide resin, polyester resin, imide resin, polyvinyl resin, polyethylene glycol, polyacrylamide, polyethylene oxide, protein, glucose oxidase, peroxidase, deoxyribonucleic acid, ribonucleic acid, polyamino acid, polyhydric phenol, and 3,5-dihydroxybenzoic acid. The smectite or other clay used in the present invention is also hydrophilic, and disperses well in water. The water-soluble polymer and clay have affinity with each other, and when they are mixed in water they readily bond and form a compound.

The clay film of the present invention can be used in a wide range of applications as a self-supporting film with excellent flexibility under high temperature conditions. For example, in addition to being used as a gasket, it can be used by being wrapped around joint threads, wrapped around a tube, or stuck onto a flat member.

An example of sticking the above-mentioned clay film onto a flat member is a multilayer application. That is, a composite clay film is combined with a film B produced from some other material, and this multilayer structure can be used to enhance gas barrier performance and mechanical strength. For example, a multilayer film can be produced by using an adhesive to stick a composite clay film together with a fluororesin film (a type of plastic film). Because a fluororesin film has low moisture permeability, a multilayer film of a fluororesin film and a composite clay film can be used as a film that has high moisture blocking performance and high gas barrier performance. There are no particular restrictions on the material of this film B, so long as the multilayer film with the clay film has good moldability, but favorable examples include a metal foil, a thin sheet of glass, various kinds of plastic films, and paper. A multilayer film consisting of three or more layers and including a composite clay film can also be used.

The clay film of the present invention can be used as a self-supporting film, can be used under high temperature conditions over. 350° C., has excellent flexibility, is a solid material that is free of pinholes, and has excellent barrier properties. Therefore, the clay film of the present invention can be used in a wide range of applications as a covering material, gasket, or separator with excellent flexibility under high temperature conditions over 350° C., and can be used to prevent leaks in pipe joints along a production line in many fields of the chemical industry, as a diaphragm in batteries and electrolysis apparatus, to cover gas piping or flat members, and so forth.

The present invention provides, for example, a protective film made of an oriented clay film whose main raw material is clay, with this protective film 1) containing 90 to 100 wt % clay with respect to the total solids content, 2) having gas barrier properties, and 3) having enough mechanical strength to be used as a self-supporting film.

With the present invention, an oriented clay film in which layers of clay particles are highly oriented and which has enough mechanical strength to be used as a self-supporting film can be obtained as a protective film self by preparing a uniform, dilute clay aqueous dispersion, allowing this dispersion to stand horizontally so that the clay particles gradually precipitate on the surface of a support, separating the liquid (the dispersion medium) by any of various solid-liquid separation methods, such as centrifugation, filtration, vacuum drying, freeze vacuum drying, and heating evaporation, then forming this product into a film, and peeling the film away from its support, and by employing manufacturing conditions here which will yield enough strength for the film to be used as a self-supporting film of uniform thickness.

A protective film composed of the oriented clay film of the present invention can be used, for example, as a protective film with excellent heat resistance under high temperature conditions over 350° C., and can be used to prevent oxidation, improve heat resistance, and so forth in a variety of members in many different industrial fields. Molecules of helium gas are smaller than those of any other gas, which means that blocking helium gas is the most difficult. A protective film composed of the oriented clay film of the present invention exhibits good gas barrier performance not only against a variety of gases, namely, air, oxygen gas, nitrogen gas, and hydrogen gas, but also against helium gas. Therefore, a protective film composed of the oriented clay film of the present invention is expected to have gas barrier properties against all gases, including organic gases. It is also possible to mold the oriented clay film and use it as a protective film for a support without first peeling it from the support surface. This is an effective way to prevent corrosion and fouling of a support, or to increase its heat resistance. This protective film is particularly effective at blocking oxygen gas, so it should be effective at preventing the oxidation of a support, and can be used, for example, to rustproof metal structural materials or metal joint components.

With the present invention, an additive such as a thickener can be added, or the solid-liquid ratio can be raised above that of a conventional clay dispersion, to obtain a clay paste with lower fluidity and high viscosity than those of the clay dispersion. Using a clay paste can shorten the drying time over that with a conventional synthesis method, and since the fluidity of a clay paste is lower, the coating film will not run out, so there is no need for the coated object to be in the form of a divided container. Furthermore, since a clay paste has a lower fluidity, it can be applied not only to a flat surface, but also to an inclined surface, among various other advantages.

The solid-liquid ratio of the clay paste used in the present invention is from 2 to 15 wt %, and preferably 4 to 7 wt %. Because a clay paste is thicker than a conventional aqueous dispersion, it dries faster. Whereas drying used to take about 5 hours with a conventional manufacturing method, the paste can be dried in about 20 minutes by adjusting the solid-liquid ratio of the clay paste to about 6%, for example. The following two methods are examples of how a clay paste can be prepared. In the first method, clay is dispersed in a dispersion medium by shaking, and the dispersion medium is slowly evaporated off under mild drying conditions (such as 50° C.) to raise the solid-liquid ratio to the desired value. In the second method, clay particles and a dispersion medium of a set solid-liquid ratio are directly kneaded.

Examples of dispersion media include water, either alone or together with a small amount of additive as needed; specifically, an additive such as an organic medium or salt can be added. The purposes of adding an additive include varying the dispersibility of the paste, varying the viscosity of the clay paste, varying the ease of drying of the clay film, and increasing the uniformity of the clay film. Examples of additives include acetamide and ethanol.

There are no particular restrictions on how an object is coated with the clay paste in the method for manufacturing the clay film of the present invention, so long as uniform coating is possible, but one favorable method is to use a blade, brush, nozzle, or other such tool so as to prevent air bubbles from being admixed. Because a clay paste has a high viscosity, it can be used to coat not only a horizontal surface, but also an inclined surface or a vertical surface. Accordingly, it is possible to produce a clay film not only when the object to be coated is a flat surface, but even when it has some other surface shape. There are no particular restrictions on the shape so long as the paste can be uniformly applied, but clay films of complex shapes that could not be produced with a conventional method can be produced by coating the inner or outer surface of an object whose shape is cubic, cuboid, tubular, cylindrical, conical, spherical, or a combination of these, then drying and peeling off the coating. When an inclined surface is coated with a clay paste, it is important to use a clay paste with high viscosity and low fluidity to maintain a uniform coating film.

The coating thickness of the clay paste is from 0.03 to 10 mm, and preferably 0.1 to 1 mm. If the coating is too thin, the clay film that is produced will also be too thin, and may not have adequate mechanical strength. If it is too thick, however, it will take a long time to dry. The clay film of the present invention can be obtained in the desired thickness by adjusting the solid-liquid ratio or the thickness in which the clay paste is applied.

There are no particular restrictions on the material of the object to be coated, but it preferably has adequate heat resistance, does not readily deform, has high thermal conductivity, and allows the clay to be peeled away easily. Examples include stainless steel, aluminum, and copper.

In the method for manufacturing the clay film of the present invention, the manufacturing steps, namely, the clay paste preparation, clay paste coating, drying, and peeling, can be carried out continuously is a serial process, which means that a clay film in the form of a long strip that could not be produced up to now can be obtained, and at the same time this increases production speed and production efficiency. It is also possible to automate the peeling of the clay film from the coated substance, and the winding of the clay film into a roll, and this further increases production efficiency.

The present invention provides an oriented clay film with uniform orientation of the clay particles. The present invention also provides the manufacture of a film that has enough mechanical strength to be used as a self-supporting film and in which the layers of clay particles are highly oriented. This thin film has excellent flexibility even at high temperatures over 350° C., has high thermal stability and good barrier properties, and can be used as a chemically table gasket, electrolyte diaphragm material, or the like. The present invention also provides a glucose oxidase composite clay film in which glucose oxidase is uniformly distributed in the gaps between clay particles and the clay particles are uniformly oriented. The present invention also provides a polyhydric phenol composite clay film in which a polyhydric phenol is uniformly distributed in the gaps between clay particles and the clay particles are uniformly oriented. The present invention also provides a nylon composite clay film in which nylon is uniformly distributed in the gaps between clay particles and the clay particles are uniformly oriented. The present invention also provides a water-soluble polymer composite clay film in which the clay particles are uniformly oriented. The present invention also provides a clay film in which the clay particles are uniformly oriented. The present invention also provides a protective film composed of an oriented clay film in which the clay particles are uniformly oriented.

BEST MODE FOR CARRYING OUT THE INVENTION

The present invention will now be described in specific terms on the basis of examples, but the present invention is not limited in any way by these examples.

EXAMPLE 1

60 cc of distilled water was added to 1.0 g of Kunipia P (as the clay; a natural montmorillonite made by Kunimine Industries), and this was put into a sealed plastic vessel along with a Teflon® agitator and shaken vigorously, which gave a uniform dispersion. This clay dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 40 µm.

Figure 1:
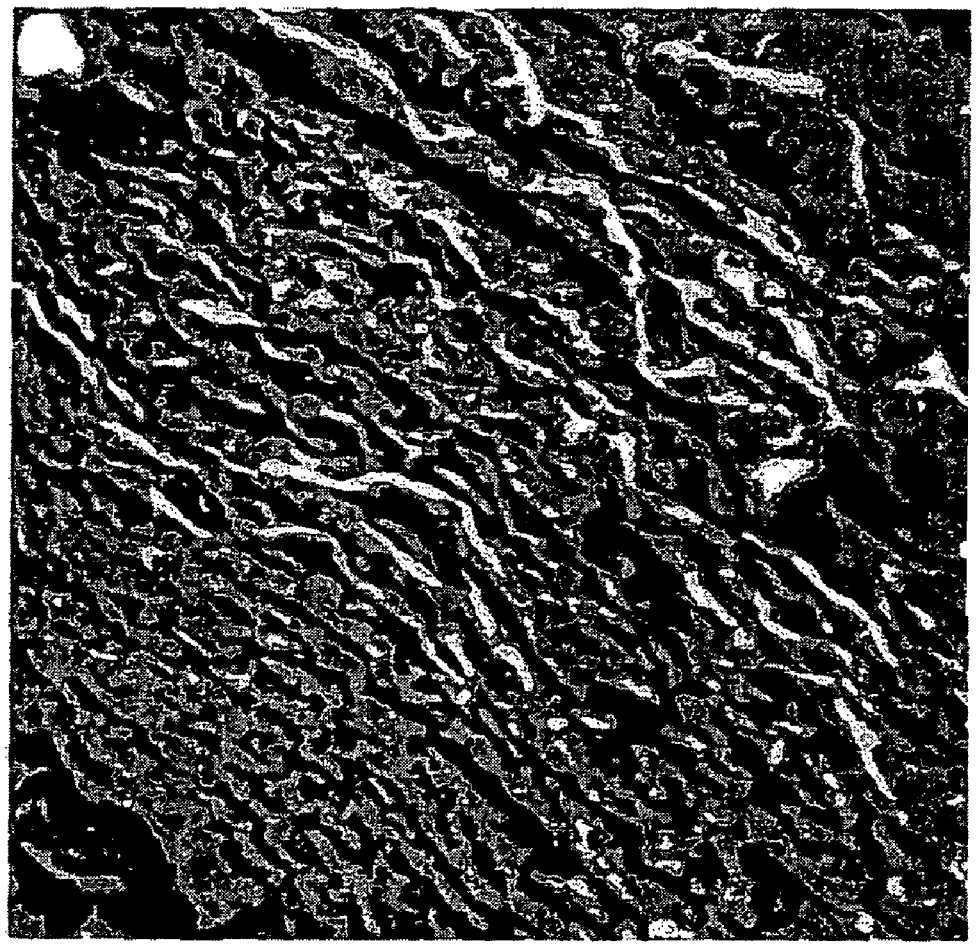
FIG. 1 is a scanning electron micrograph of a Kunipia P clay thin film.
Figure 2:
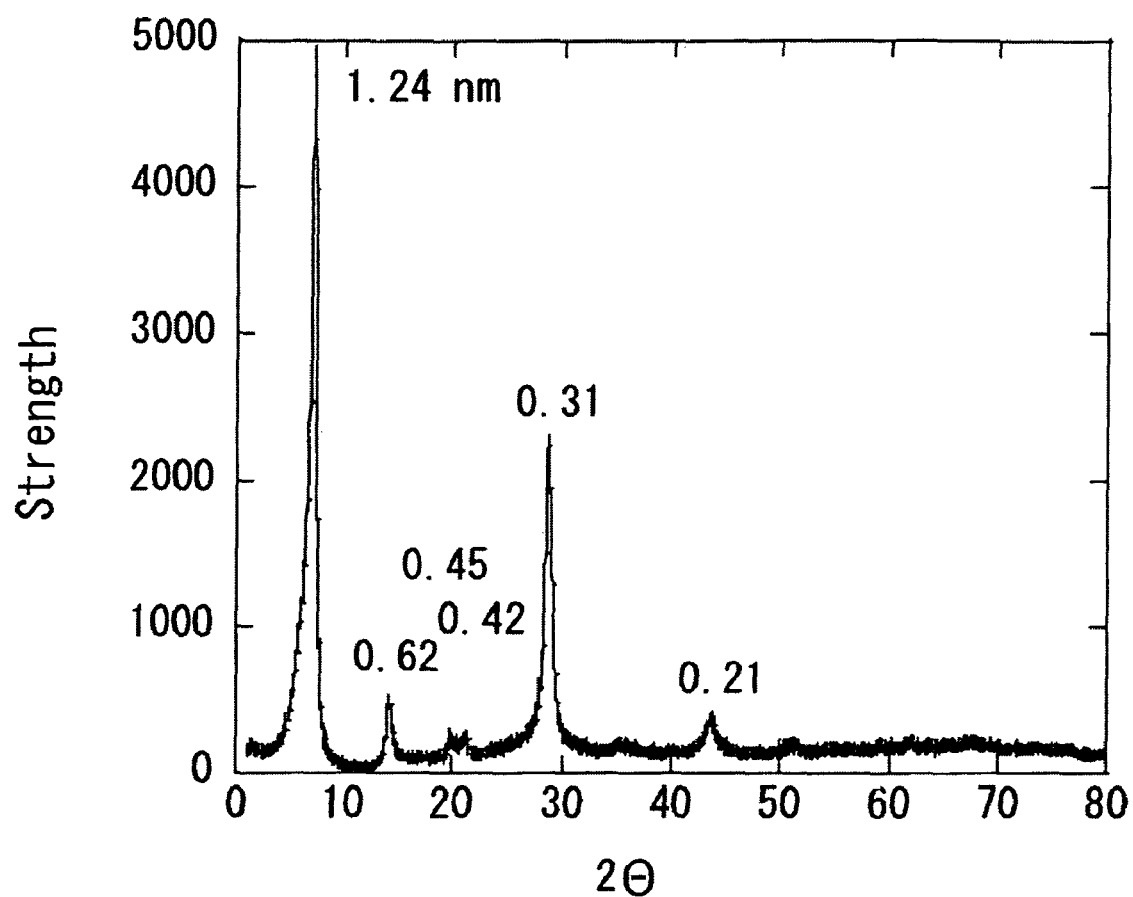
FIG. 2 is an X-ray diffraction chart of a Kunipia P clay thin film.

FIG. 1 shows a scanning electron micrograph of this clay thin film. It can be seen in FIG. 1 that the layers of clay particles are highly oriented. FIG. 2 is an X-ray diffraction chart of this clay thin film. A series of sharp back reflection peaks (001), (002), (003), (004), and (005) are seen at positions of 1.24, 0.62, 0.42, 0.31, and 0.21 nm, respectively, indicating that the orientation of the particles in the clay thin film is very uniform. The water permeation coefficient of this clay film was also measured for the purpose of confirming its barrier performance. The water permeation coefficient was measured by the method set forth in JIS A 1218 "Method for Testing Water Permeation of Soil," and the water permeation coefficient of this clay thin film (sodium Kunipia film) was found to be $1 \times 10^{-11}$ cm/sec. This value matches well the value of the water permeation coefficient of montmorillonite found by molecular dynamics method (Ichikawa et al., Nihon Genshiryoku Gakkai-shi, 41, 12-21 (1999)), confirming that there were no pinholes or the like.

EXAMPLE 2

60 cc of distilled water was added to magnesium Kunipia P (as the clay), obtained by exchanging the exchangeable ions of 1.0 g of Kunipia P (a natural montmorillonite made by Kunimine Industries) with magnesium, and this was put into a sealed plastic vessel along with a Teflon® agitator and shaken vigorously, which gave a clay dispersion. This clay dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 70 µm.

Figure 3:
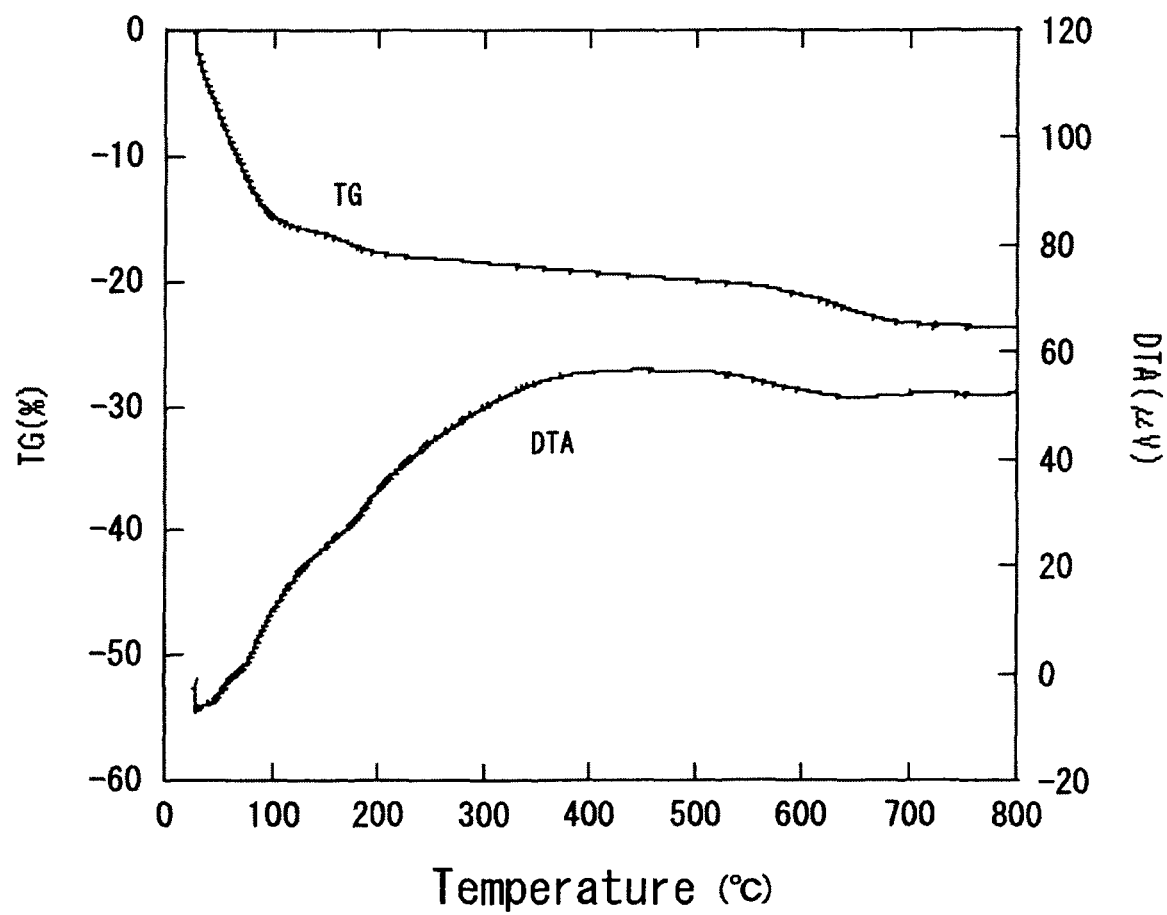
FIG. 3 is a TG-DTA chart of a magnesium Kunipia P powder (temperature elevation rate: 5° C./minute, under an argon atmosphere)
Figure 4:
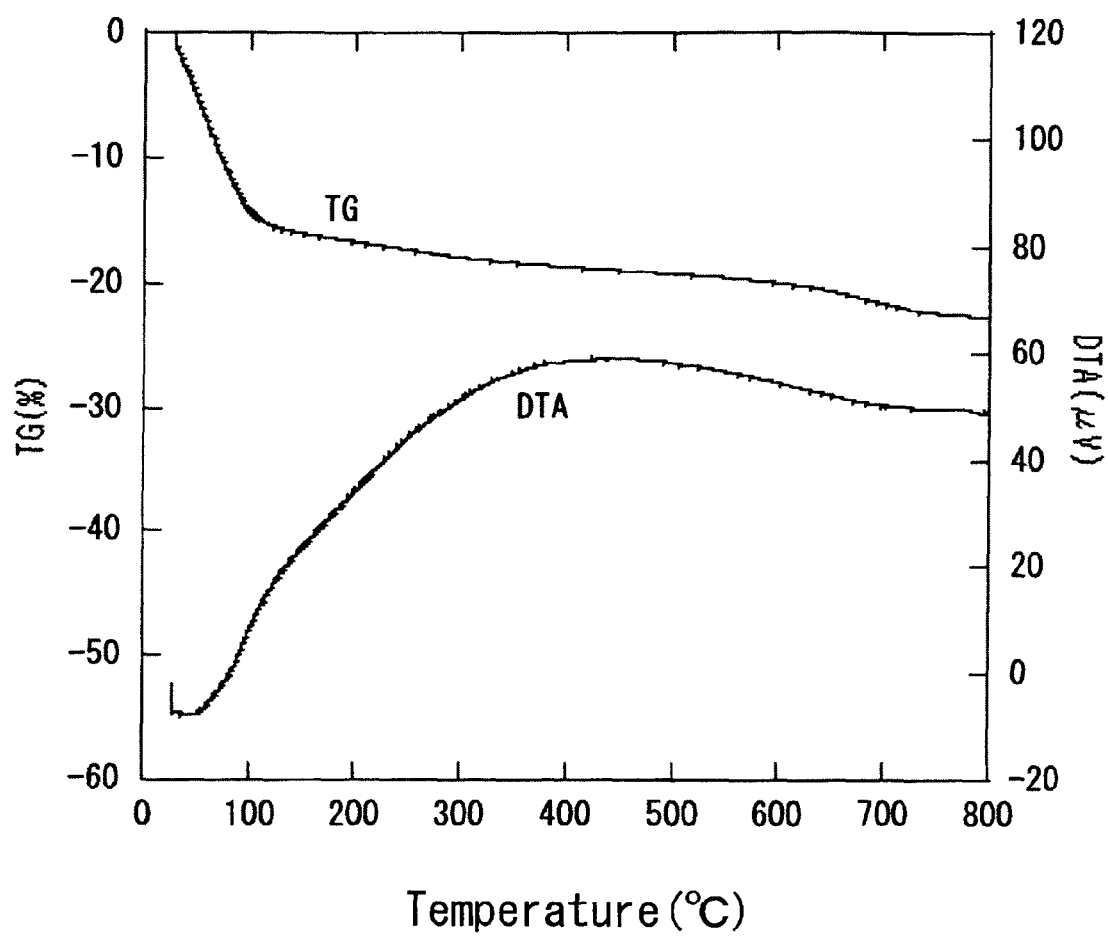
FIG. 4 is a TG-DTA chart of a magnesium Kunipia P thin film (temperature elevation rate: 5° C./minute, under an argon atmosphere)

The clay thin film thus produced was dried in an oven held at 110° C., which allowed the film to be easily peeled from the tray. The water permeation coefficient of this clay thin film (magnesium Kunipia P) was measured and found to be $2 \times 10^{-10}$ cm/sec. FIG. 3 is a TG-DTA chart of magnesium Kunipia powder. Weight loss was seen to accompany dehydration up to 200° C., and weight loss was also caused by removal of structural hydroxyl groups near 600° C. (H. Shiramizu, "Clay Mineralogy—Basics of Clay Science," Asakura Shoten, p. 96-98 (1988)). Meanwhile, in a TG-DTA chart of a magnesium Kunipia film prepared using magnesium Kunipia powder (FIG. 4), the weight loss caused by the removal of structural hydroxyl groups near 600° C. shifted to the high temperature side, and it can be seen that the weight loss width is narrower. The reason for this is believed to be that the film is packed with no gaps, which makes it less likely that the removal of structural hydroxyl groups will cause structural changes. This result also indicates that the clay thin film has high thermal stability at temperatures of 250° C. or higher.

EXAMPLE 3

60 cc of distilled water was added to 1.0 g of Smectone (as the clay; a synthetic saponite made by Kunimine Industries), and this was put into a sealed plastic vessel along with a Teflon® agitator and shaken vigorously, which gave a uniform dispersion. This clay dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 70 µm. The clay thin film thus produced was dried in an oven held at 110° C., which allowed the film to be easily peeled from the tray. The water permeation coefficient of this clay thin film was measured and found to be $2 \times 10^{-10}$ cm/sec, and high water blocking was exhibited.

EXAMPLE 4

60 cc of distilled water was added to 1.0 g of Kunipia P (as the clay; a natural montmorillonite made by Kunimine Industries), and this was put into a sealed plastic vessel along with a Teflon® agitator and shaken vigorously, which gave a uniform dispersion. This clay dispersion was poured into a flat-bottomed brass tray that had a circular bottom measuring about 15 cm in diameter, and the clay dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 70 µm. The clay thin film thus produced was dried in an oven held at 110° C., which allowed the film to be easily peeled from the tray.

The helium, hydrogen, oxygen, nitrogen, and air permeation coefficients of this film were measured with a Gasperm-100 made by JASCO. The gas permeation coefficients for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance. Even after this composite thin film was heated for 24 hours at 1000° C., the gas permeation coefficients of the composite thin film for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance even after high-temperature treatment. The optical transmissivity of this film was measured with a U-3310 absorptiometer made by Hitachi. The optical transmissivity was measured by immersing the film in ethanol in a quartz rectangular cell and using light with a wavelength of 500 nm. As a result, the optical transmissivity was found to be 75%.

EXAMPLE 5

60 cc of distilled water was added to 0.95 g of Smectone (as the clay; a synthetic saponite made by Kunimine Industries), and this was put into a sealed plastic vessel along with a Teflon® agitator and shaken vigorously, which gave a uniform dispersion. This dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 µm. Observation by electron microscope revealed that the metal sheet and the clay thin film interfaces were in contact, with no gap in between, so the film did not peel away when merely touched by hand.

EXAMPLE 6

60 cc of distilled water was added to 0.95 g of Kunipia P (as the clay; a natural montmorillonite made by Kunimine Industries), and this was put into a sealed plastic vessel along with a Teflon® agitator and shaken vigorously, which gave a uniform dispersion. To this dispersion was added 0.05 g of glucose oxidase powder (made by Tokyo Kasei Kogyo), and this dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 40 µm.

Figure 5:
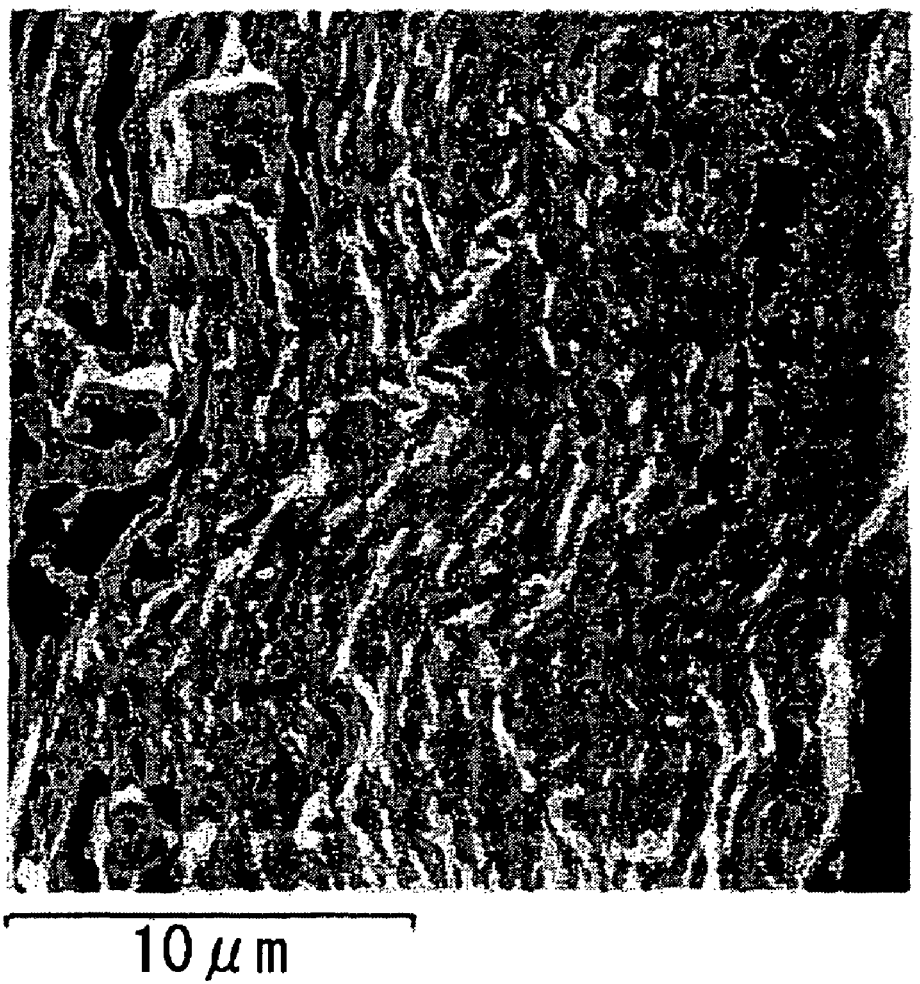
FIG. 5 is a scanning electron micrograph of a glucose oxidase Kunipia P thin film.
Figure 6:
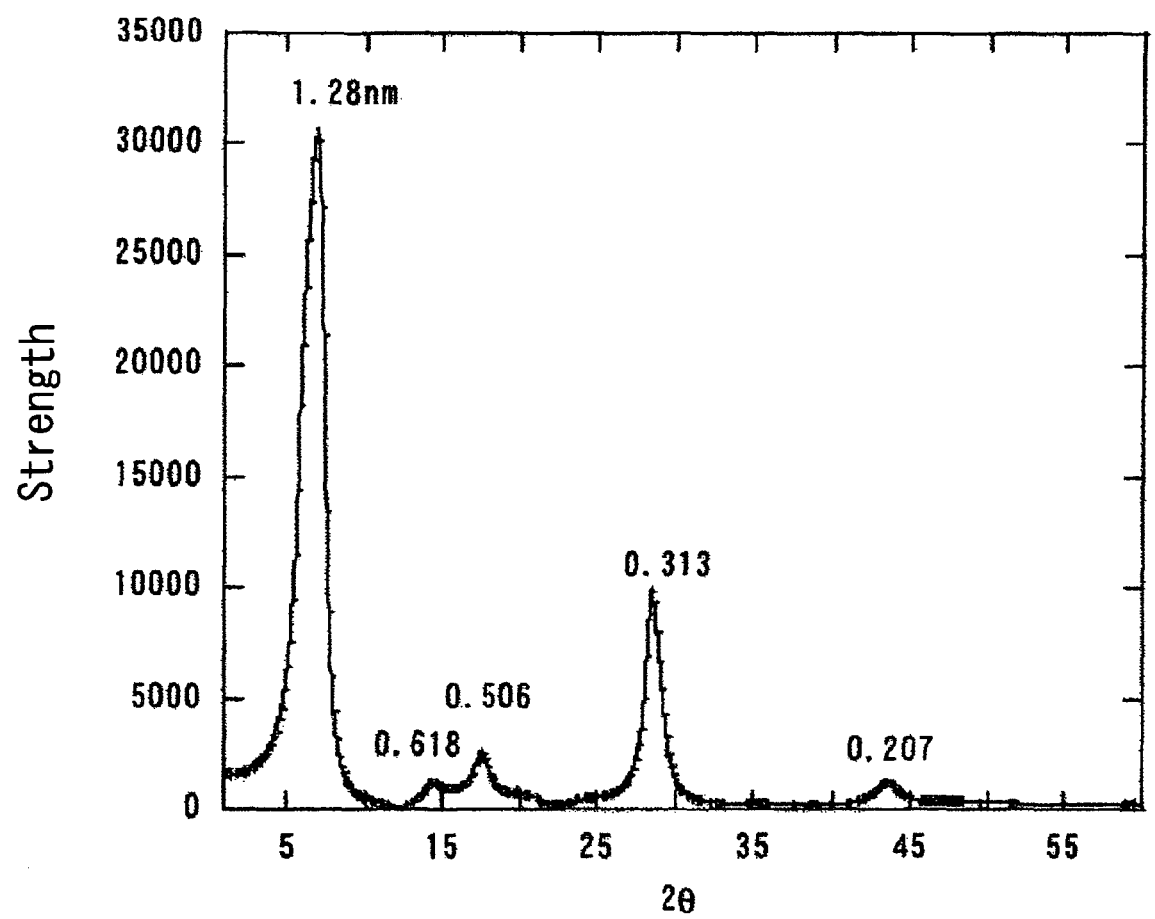
FIG. 6 is an X-ray diffraction chart of a glucose oxidase Kunipia P thin film.

FIG. 5 is a scanning electron micrograph of this clay thin film. It can be seen from FIG. 5 that glucose oxidase is uniformly distributed in the gaps between clay particles, in which the layers of clay particles are highly oriented. FIG. 6 is an X-ray diffraction chart of this clay thin film. Back reflection peaks 001, 002, 004, and 005 are seen at positions of 1.28, 0.62, 0.31, and 0.21 nm, respectively, indicating that the orientation of the particles in the clay thin film is very uniform. Because these positions correspond well to the 1.24, 0.62, 0.31, and 0.21 nm that are the positions of the back reflection peaks 001, 002, 004, and 005 of a clay thin film containing no glucose oxidase, we can see that the glucose oxidase is present in the gaps between the clay particles, and not between the smectite clay layers.

Figure 7:
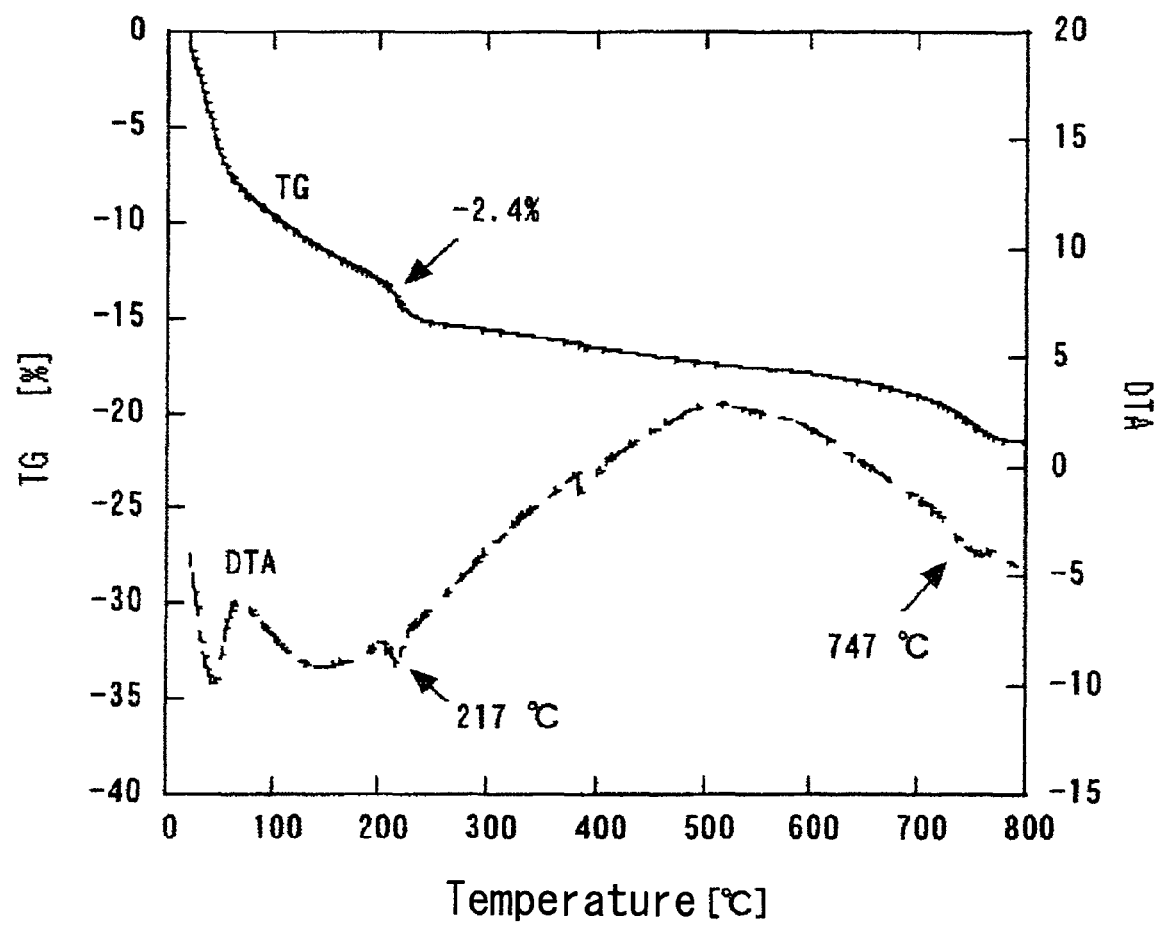
FIG. 7 is a TG-DTA chart of a glucose oxidase Kunipia P thin film (temperature elevation rate: 5° C./minute, under an argon atmosphere)

Next, the water permeation coefficient of this clay thin film was measured to confirm its barrier performance. A glucose oxidase Kunipia P thin film was used as the sample. The ratio of the weight of the glucose oxidase in this film to the combined weight of clay and glucose oxidase was 5%. The water permeation coefficient was measured by the method set forth in JIS A 1218 "Method for Testing Water Permeation of Soil," and found to be $1 \times 10^{-9}$ m/sec. Since the water permeation coefficient is sufficiently small, this confirms that no pinholes or the like were present. FIG. 7 is a TG-DTA chart of a glucose oxidase Kunipia P thin film. Weight loss accompanying dehydration from room temperature up to 200° C., and weight loss of 2.4% caused by decomposition of the glucose oxidase above 200° C. were observed. Also observed were the breakdown of the structure of the clay mineral near 750° C., and weight loss accompanying atomic realignment and recrystallization.

EXAMPLE 7

60 cc of distilled water was added to 0.85 g of Kunipia P (as the clay; a natural montmorillonite made by Kunimine Industries), and this was put into a sealed plastic vessel along with a Teflon® agitator and shaken vigorously, which gave a uniform dispersion. To this dispersion was added 0.15 g of glucose oxidase powder (made by Tokyo Kasei Kogyo), and this dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 40 µm.

EXAMPLE 8

60 cc of distilled water was added to 0.95 g of Smectone (as the clay; a synthetic saponite made by Kunimine Industries), and this was put into a sealed plastic vessel along with a Teflon® agitator and shaken vigorously, which gave a uniform dispersion. To this dispersion was added 0.05 g of glucose oxidase powder (made by Tokyo Kasei Kogyo), and this dispersion was poured into a flat-bottomed polypropylene tray that had a square bottom measuring about 10 cm on each side, and the clay dispersion was allowed to stand horizontally so that the clay particles would gradually settle. With the tray held horizontal, the dispersion was dried for 5 hours at a temperature of 50° C. in a forced air oven, which gave a semi-transparent clay thin film with a thickness of approximately 40 µm.

EXAMPLE 9

60 cc of distilled water was added to 0.85 g of Kunipia P (as the clay; a natural montmorillonite made by Kunimine Industries), and this was put into a sealed plastic vessel along with a Teflon® agitator and shaken vigorously, which gave a uniform dispersion. To this dispersion was added 0.15 g of glucose oxidase powder (made by Tokyo Kasei Kogyo), and this dispersion was poured into a flat-bottomed brass tray that had a circular bottom measuring about 15 cm in diameter, and the clay dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 µm. The clay thin film thus produced was dried in an oven held at 110° C., which allowed the film to be easily peeled from the tray.

The helium, hydrogen, oxygen, nitrogen, and air permeation coefficients of this film were measured with a Gasperm-100 made by JASCO. The gas permeation coefficients for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance. Even after this composite thin film was heated for 24 hours at 500° C., the gas permeation coefficients of the composite thin film for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance even after high-temperature treatment. The optical transmissivity of this film was measured with a U-3310 absorptiometer made by Hitachi. The optical transmissivity was measured by immersing the film in ethanol in a quartz rectangular cell and using light with a wavelength of 500 nm. As a result, the optical transmissivity was found to be 56%.

EXAMPLE 10

60 cc of distilled water was added to 0.95 g of Smectone (as the clay; a synthetic saponite made by Kunimine Industries), and this was put into a sealed plastic vessel along with a Teflon® agitator and shaken vigorously, which gave a uniform dispersion. To this dispersion was added 0.05 g of glucose oxidase powder (made by Tokyo Kasei Kogyo), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 μm. Observation by electron microscope revealed that the metal sheet and the clay thin film interfaces were in contact, with no gap in between, so the film did not peel away when merely touched by hand.

EXAMPLE 11

60 cc of distilled water was added to 0.70 g of Kunipia P (as the clay; a natural montmorillonite made by Kunimine Industries), and this was put into a sealed plastic vessel along with a Teflon® agitator and shaken vigorously, which gave a uniform dispersion. To this dispersion was added 0.30 g of resorcinol powder (as a polyhydric phenol; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform polyhydric phenol composite clay thin film with a thickness of approximately 30 μm. The clay thin film thus produced was dried in an oven held at 110° C. This gave a clay thin film that could be easily peeled from the tray. This film was then heated for 12 hours at 300° C. in an air atmosphere, which gave a heat-treated clay thin film.

Figure 8:
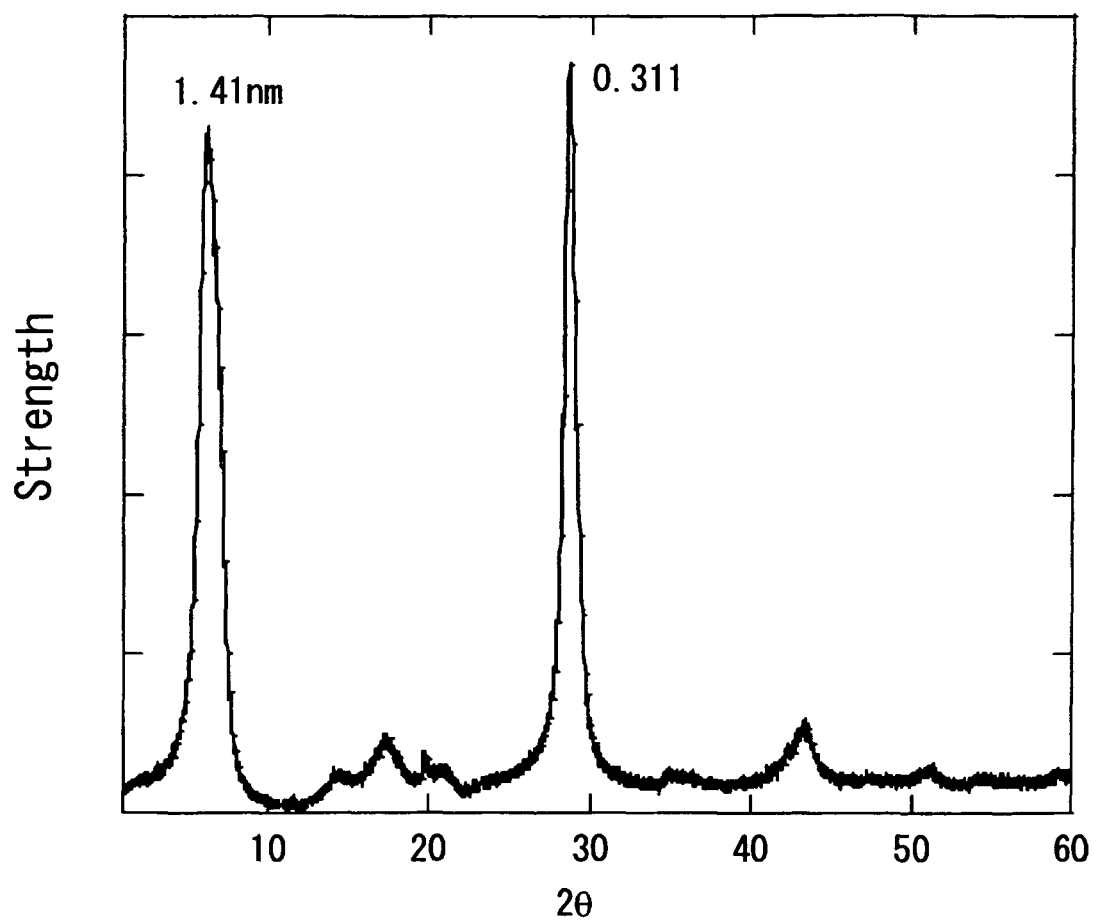
FIG. 8 is an X-ray diffraction chart of a polyhydric phenol composite clay thin film (resorcinol Kunipia P thin film)
Figure 9:
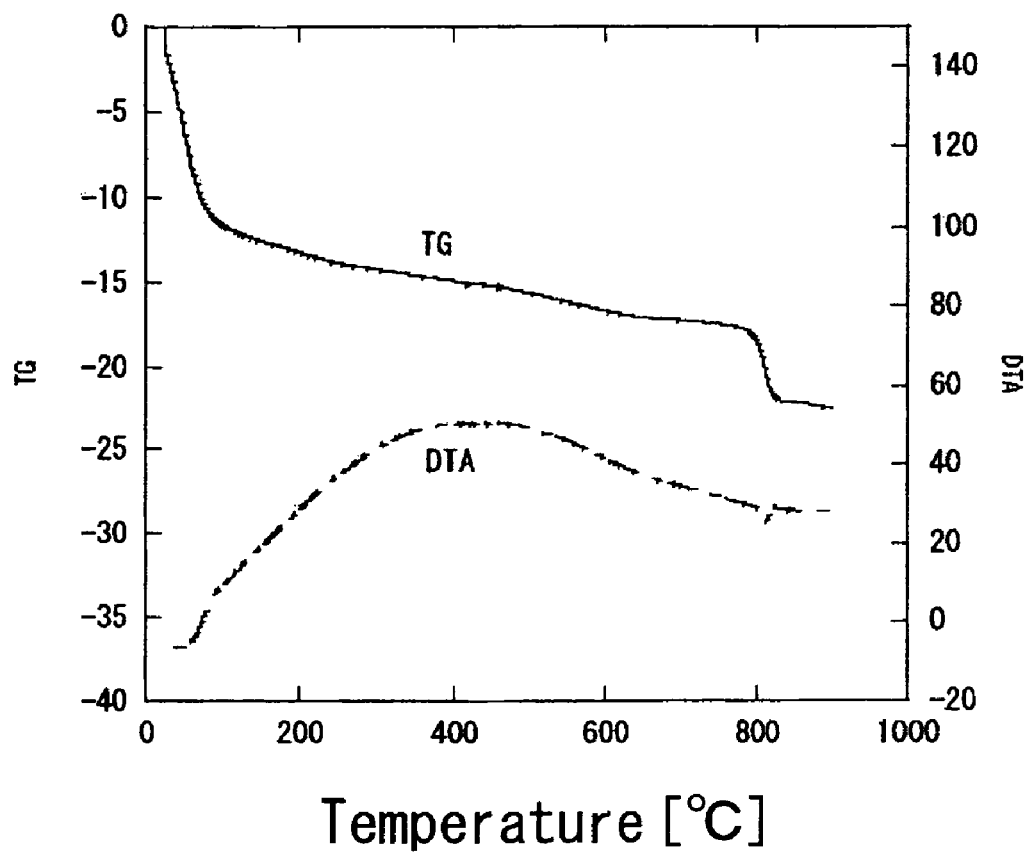
FIG. 9 is a TG-DTA chart of a polyhydric phenol composite clay thin film (resorcinol Kunipia P thin film) (temperature elevation rate: 5° C./minute, under an argon atmosphere)
Figure 10:
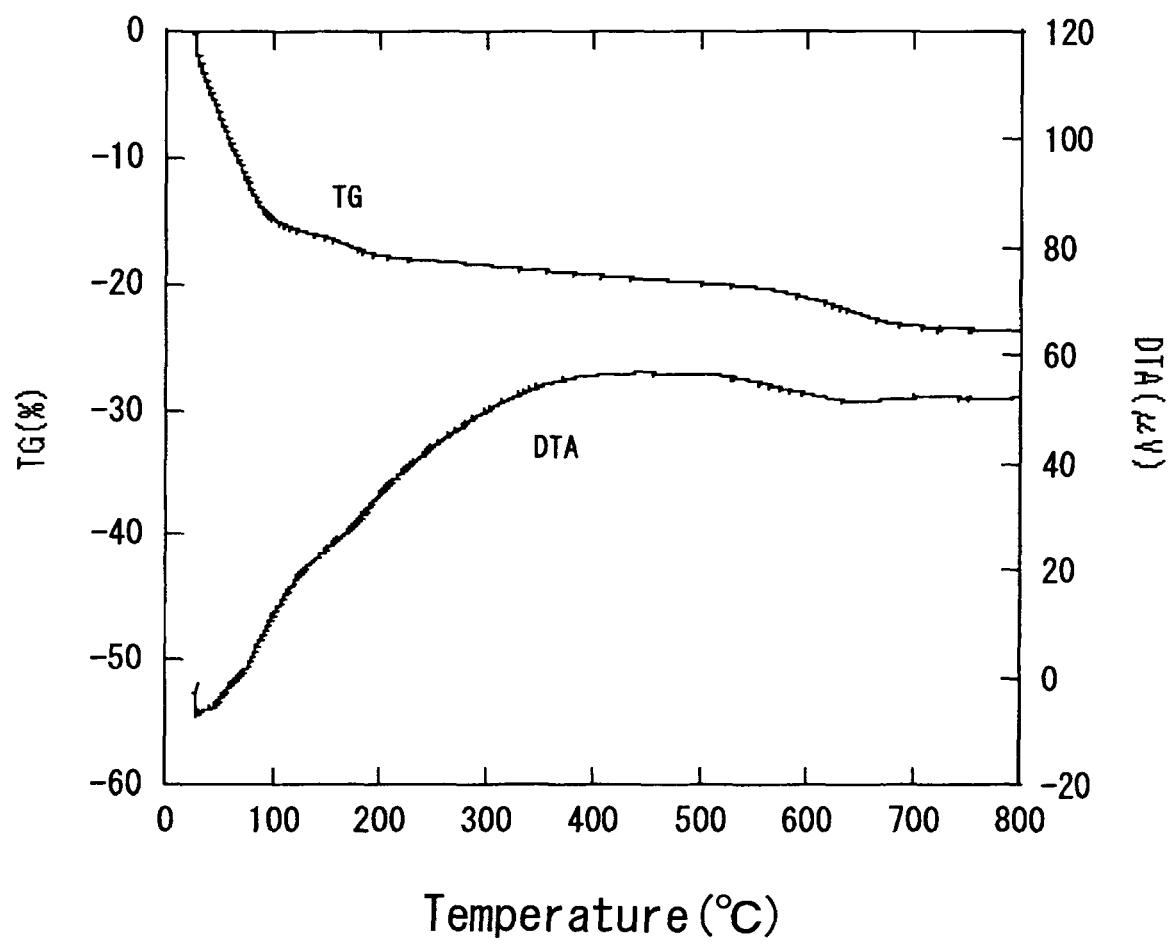
FIG. 10 is a TG-DTA chart of a montmorillonite (Kunipia P) powder (temperature elevation rate: 5° C./minute, under an argon atmosphere)

FIG. 8 is an X-ray diffraction chart of this clay thin film. The film was observed at the position where the back reflection peak 001 was d=1.41 nm. This is spread out more than the value of 1.24 nm for a clay thin film (Kunipia P thin film), and corresponds to a structure in which resorcinol is incorporated between layers of montmorillonite (Kunipia P). It can be seen from these results that resorcinol is present between layers of montmorillonite (Kunipia P), and is included in the clay layers. FIG. 9 is a TG-DTA chart of a polyhydric phenol composite clay thin film (resorcinol Kunipia P thin film). The TG curve shows a reduction in weight caused by the dehydration of adsorbed water from room temperature up to 200° C. A large weight reduction was observed from 750 to 800° C. FIG. 10 is a TG-DTA chart of montmorillonite (Kunipia P) powder. Weight loss was seen to accompany dehydration up to 200° C., and weight loss was also caused by removal of structural hydroxyl groups near 600° C. (H. Shiramizu, "Clay Mineralogy—Basics of Clay Science," Asakura Shoten, p. 96-98 (1988)).

Figure 11:
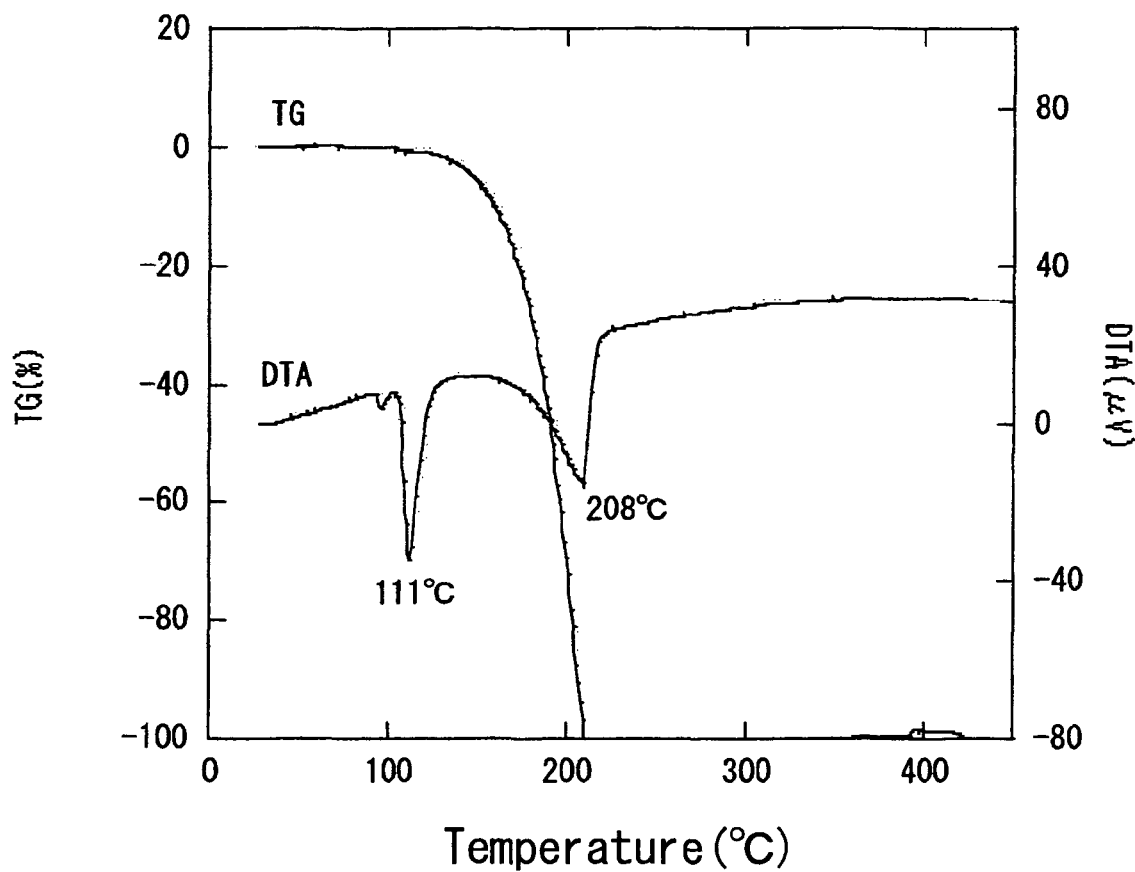
FIG. 11 is a TG-DTA chart of a polyhydric phenol (resorcinol) (temperature elevation rate: 5° C./minute, under an argon atmosphere)

A comparison of the TG-DTA charts for the polyhydric phenol composite clay thin film (resorcinol Kunipia P thin film) and the montmorillonite (Kunipia P) powder reveals that forming a film along with resorcinol shifts the removal of structural hydroxyl groups in the montmorillonite (Kunipia P) toward the high temperature side, thereby increasing heat resistance. Peaks corresponding to the melting and boiling of resorcinol were observed at 111° C. and 208° C., respectively, on the DTA curve in the TG-DTA charts for montmorillonite (Kunipia P) (FIG. 10) and for resorcinol (polyhydric phenol; FIG. 11). This phase change in resorcinol is not observed in the DTA curve of the TG-DTA chart for the polyhydric phenol composite clay thin film (resorcinol Kunipia P thin film). This tells us that resorcinol is uniformly distributed on the molecular level in the clay thin film (Kunipia P thin film), and is stabilized.

The helium, hydrogen, oxygen, nitrogen, and air permeation coefficients of this film were measured with a Gasperm-100 made by JASCO. The gas permeation coefficients for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance. Even after this composite thin film was heated for 24 hours at 500° C., the gas permeation coefficients of the composite thin film for helium, hydrogen, oxygen, nitrogen, and air at room temperature were confirmed to be less than $3.2 \times 10^{-11}$ cm$^2$s$^{-1}$cmHg$^{-1}$, which tells us that the film exhibits gas barrier performance even after high-temperature treatment.

EXAMPLE 12

60 cc of distilled water was added to 0.70 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.30 g of resorcinol powder (as a polyhydric phenol; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform polyhydric phenol composite clay thin film (phloroglucin Kunipia P thin film) with a thickness of approximately 30 μm. The clay thin film thus produced was dried in an oven held at 110° C. This gave a clay thin film that could be easily peeled from the tray.

Figure 12:
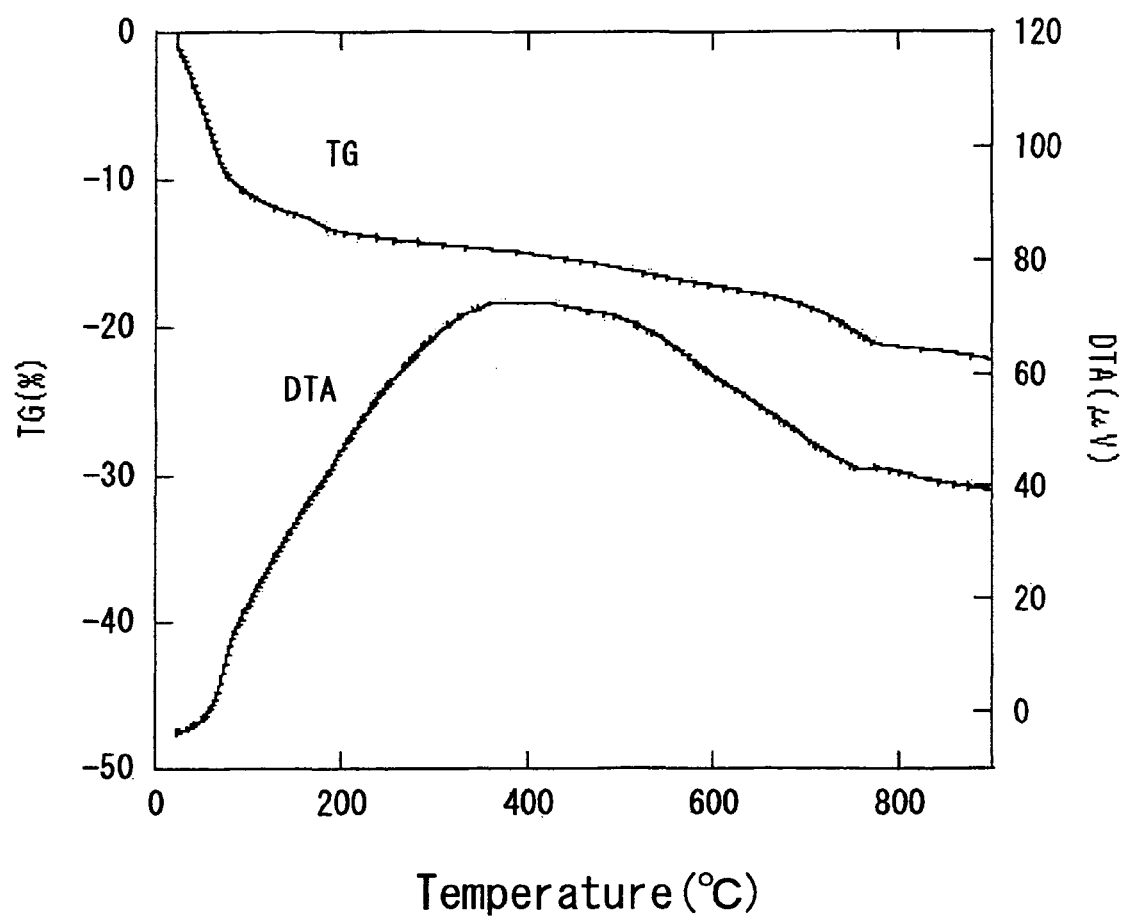
FIG. 12 is a TG-DTA chart of a polyhydric phenol composite clay thin film (phloroglucin Kunipia P thin film) (temperature elevation rate: 5° C./minute, under an argon atmosphere)
Figure 13:
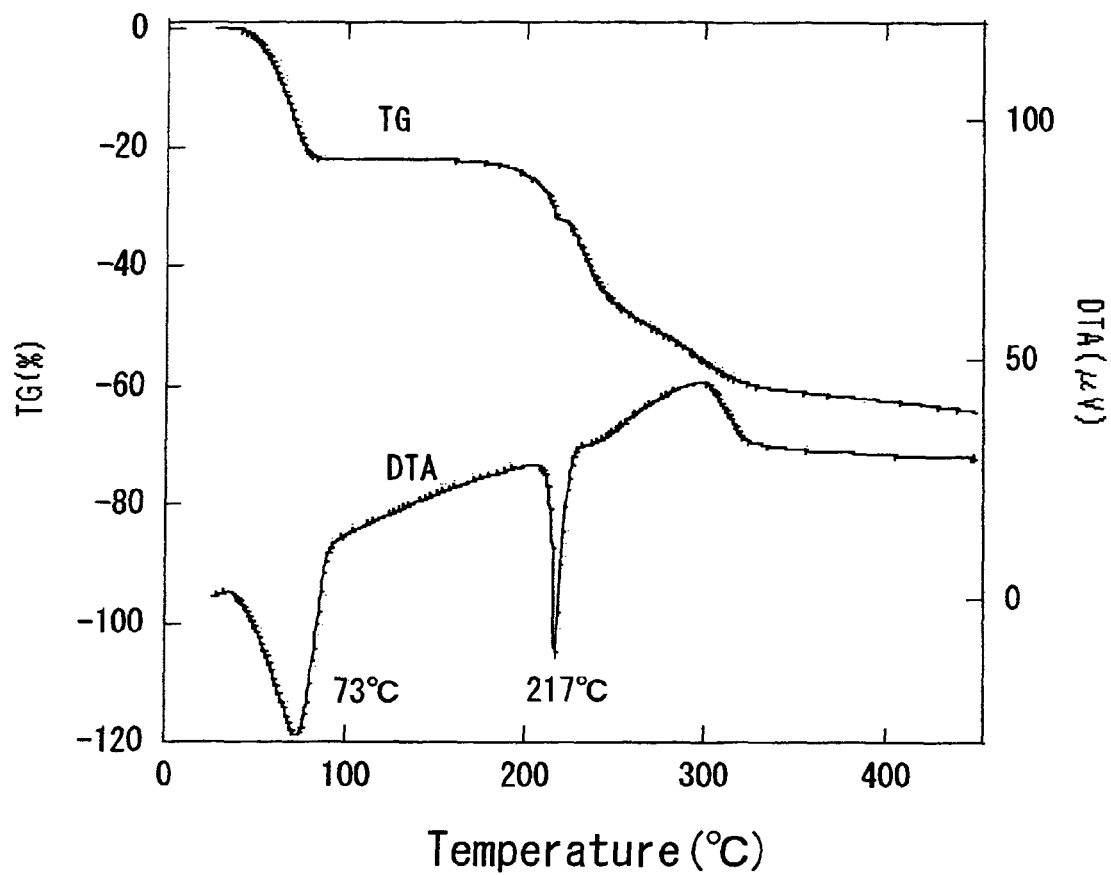
FIG. 13 is a TG-DTA chart of a polyhydric phenol (phloroglucin) (temperature elevation rate: 5° C./minute, under an argon atmosphere)

FIG. 12 is a TG-DTA chart of the above-mentioned polyhydric phenol composite clay thin film (phloroglucin Kunipia P thin film). The TG curve shows a reduction in weight caused by the dehydration of adsorbed water from room temperature up to 200° C. A large weight reduction was observed from 600 to 750° C. FIG. 13 is a TG-DTA chart of phloroglucin (polyhydric phenol). The TG curve shows a large reduction in weight accompanying dehydration condensation from 200° C. to over 300° C., and the dehydration peak at not more than 100° C. It can be seen from the DTA curve that with phloroglucin alone, a dehydration condensation reaction proceeded after melting at 217° C. The change observed with phloroglucin alone was not observed in the DTA curve of the TG-DTA chart of the polyhydric phenol composite clay thin film (phloroglucin Kunipia P thin film). This tells us that phloroglucin is uniformly distributed on the molecular level in the clay thin film (Kunipia P thin film), and is stabilized.

EXAMPLE 13

60 cc of distilled water was added to 0.70 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.30 g of resorcinol powder (as a polyhydric phenol; made by Wako Pure Chemical Industries), and this dispersion was poured into a flat-bottomed polypropylene tray that had a square bottom measuring about 10 cm on each side, and the dispersion was allowed to stand horizontally so that the clay particles would gradually settle. With the tray held horizontal, the dispersion was dried for 5 hours at a temperature of 50° C. in a forced air oven, which gave a semi-transparent, circular polyhydric phenol composite clay thin film with a thickness of approximately 30 μm.

Comparative Example 1

60 cc of distilled water was added to 0.70 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.30 g of resorcinol powder (as a polyhydric phenol; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform polyhydric phenol composite clay thin film with a thickness of approximately 30 μm. The clay thin film thus produced was dried in an oven held at 110° C. This gave a clay thin film that could be easily peeled from the tray. When this film was immersed in distilled water, it swelled and then fell apart a few dozen minutes later, which means that it could not be kept in the form of a self-supporting film.

EXAMPLE 14

60 cc of distilled water was added to 0.70 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.30 g of resorcinol powder (as a polyhydric phenol; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform polyhydric phenol composite clay thin film with a thickness of approximately 30 μm. The clay thin film thus produced was dried in an oven held at 110° C. This gave a clay thin film that could be easily peeled from the tray. This film was then heated for 12 hours at 300° C. in an air atmosphere, which gave a heat-treated clay thin film.

This heat-treated clay thin film did not swell even after being soaked for 10 days in distilled water, and could be used as a self-supporting film. The helium, hydrogen, oxygen, nitrogen, and air permeation coefficients of this film were confirmed to be less than $3.2 \times 10^{-11}$ $cm^2 s^{-1} cmHg^{-1}$, which tells us that the film exhibits gas barrier performance even after being soaked in distilled water.

EXAMPLE 15

60 cc of distilled water was added to 0.95 g of synthetic saponite (as the clay; Smectone, made by Kunimine Industries), and this was put into a sealed plastic vessel along with a Teflon® agitator and shaken vigorously, which gave a uniform dispersion. To this dispersion was added 0.05 g of resorcinol powder (made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 μm. Observation by electron microscope revealed that the metal sheet and the clay thin film interfaces were in contact, with no gap in between, so the film did not peel away when merely touched by hand.

EXAMPLE 16

60 cc of distilled water was added to 0.95 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.05 g of epsilon-caprolactam powder (as a nylon monomer; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform nylon monomer composite clay thin film with a thickness of approximately 30 μm. The clay thin film thus produced was peeled from the tray and heat treated for 5 hours in a heating oven held at 250° C., which gave a nylon composite clay film.

Figure 14:
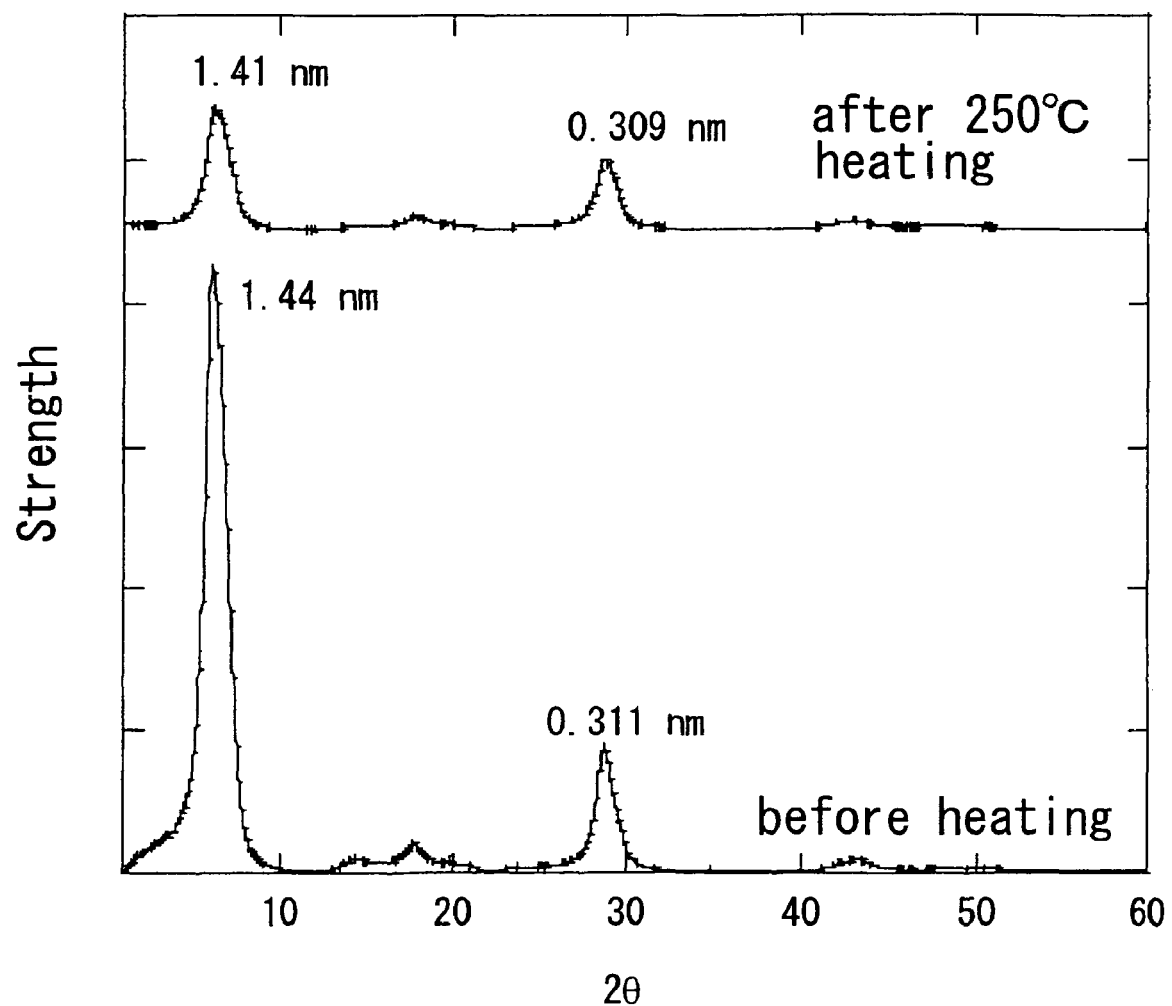
FIG. 14 is an X-ray diffraction chart of a nylon composite clay thin film.
Figure 15:
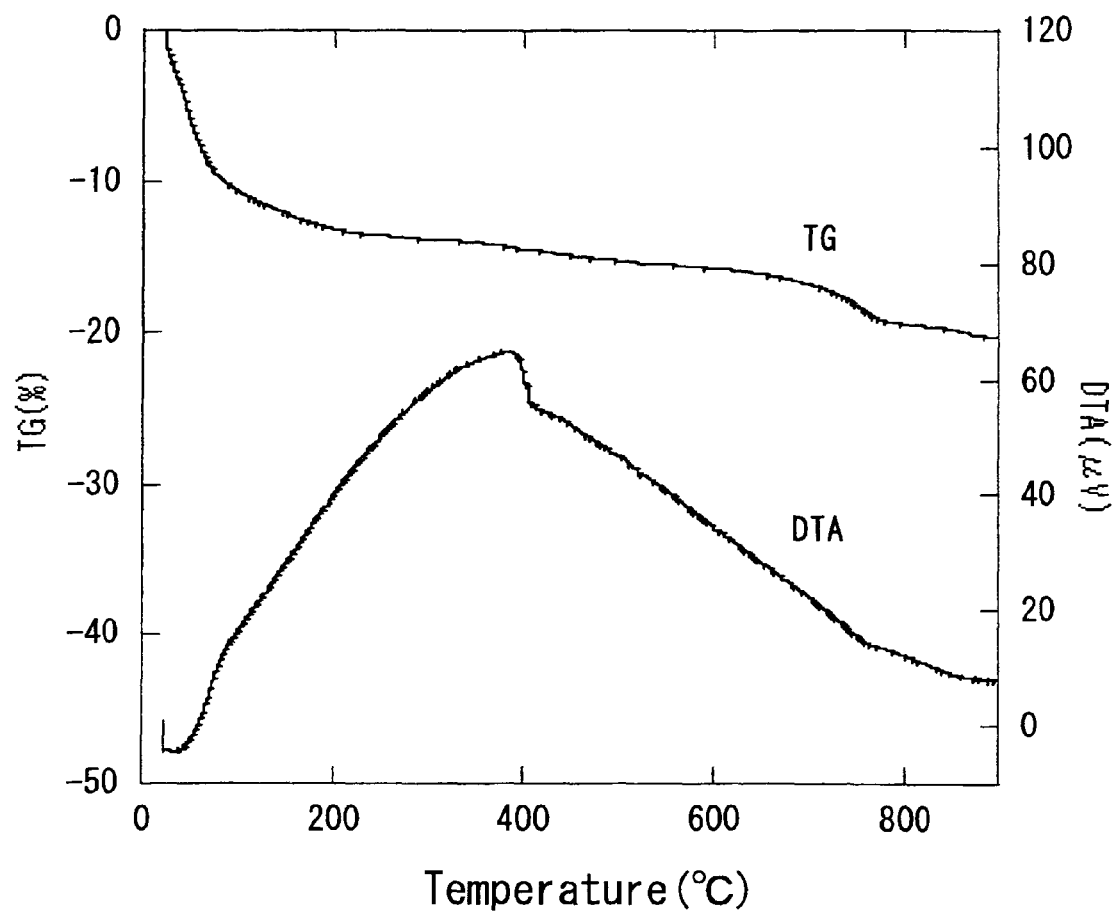
FIG. 15 is a TG-DTA chart of a nylon composite clay thin film (temperature elevation rate: 5° C./minute, under an argon atmosphere)

FIG. 14 is an X-ray diffraction chart of the nylon monomer composite clay film before heat treatment and the nylon composite clay film after heat treatment at 250° C. The back reflection peaks 001 before and after this heat treatment were observed at positions of d1.44 nm and 1.41 nm, respectively. These were spread out more than the 1.24 nm value of a clay thin film (Kunipia P thin film), and respectively correspond to structures in which a nylon monomer and nylon are incorporated between layers of montmorillonite (Kunipia P). These results tell us that the nylon monomer and nylon are present between layers of montmorillonite (Kunipia P), and are included in the clay layers. FIG. 15 is a TG-DTA chart of a nylon composite clay thin film. The TG curve shows a reduction in weight caused by the dehydration of adsorbed water from room temperature up to 200° C. A very slight weight reduction was observed near 400° C. A large weight reduction in montmorillonite was observed from 700 to 800° C.

Figure 16:
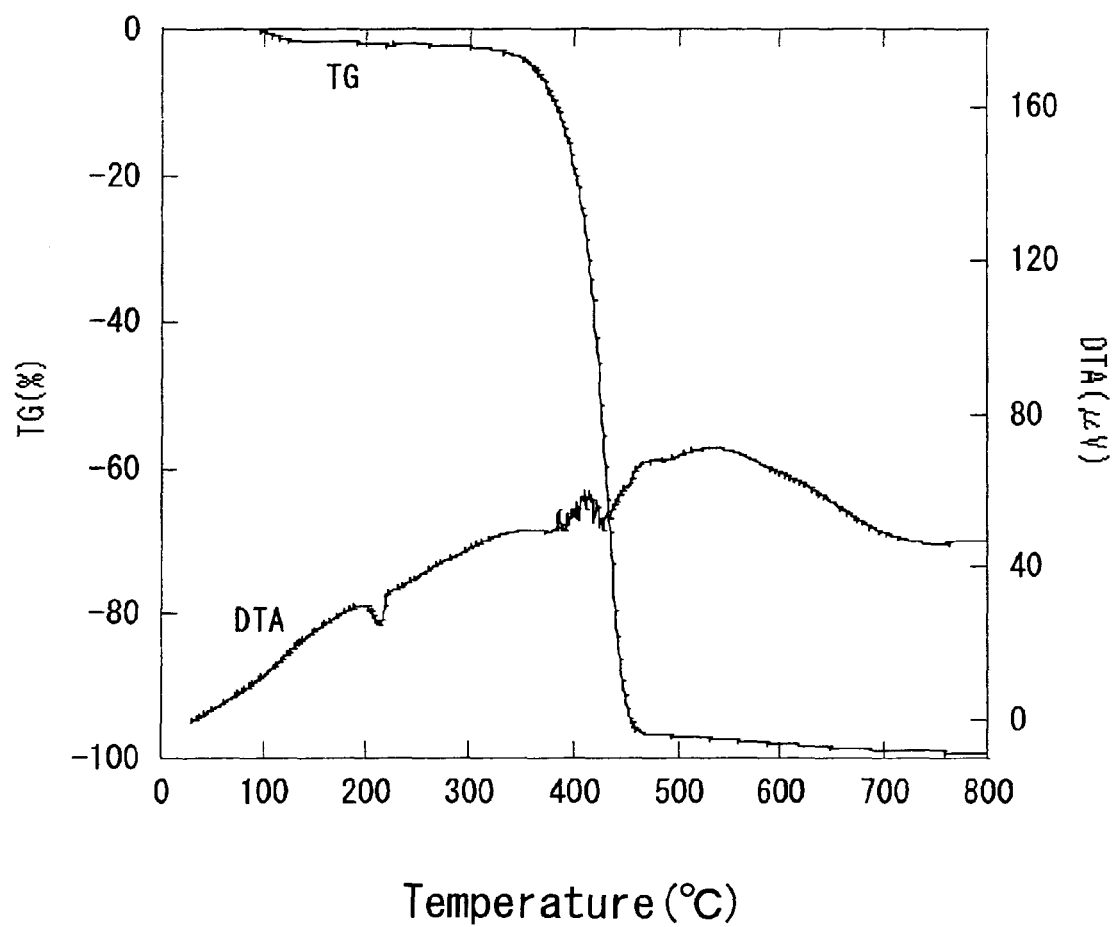
FIG. 16 is a TG-DTA chart of a nylon yarn (temperature elevation rate: 5° C./minute, under an argon atmosphere)

FIG. 16 is a TG-DTA chart of a commercially available nylon yarn. A peak corresponding to the decomposition of nylon is seen near 400° C. on the DTA curve. This tells us that the weight reduction of the nylon composite clay thin film near 400° C. in FIG. 15 accompanies the decomposition of nylon, and this indicates that the nylon monomer is polymerized within the composite clay film. The air permeation coefficient of the nylon composite clay film (the weight ratio of nylon monomer to total solids was 10%) was measured with a Gasperm-100 made by JASCO and confirmed to be less than $3.2\times10^{-11}$ $cm^2s^{-1}cmHg^{-1}$, at room temperature, which tells us that the film exhibits gas barrier performance. The air permeation coefficient of the film after heat treatment for 24 hours at 500° C. was confirmed to be less than $3.2\times10^{-11}$ $cm^2s^{-1}cmHg^{-1}$, at room temperature, which tells us that the film exhibits gas barrier performance even after high-temperature treatment. The optical transmissivity of this film was measured with a U-3310 absorptiometer made by Hitachi. The optical transmissivity was measured by immersing the film in ethanol in a quartz rectangular cell and using light with a wavelength of 500 nm. As a result, the optical transmissivity was found to be 88%.

EXAMPLE 17

60 cc of distilled water was added to natural montmorillonite (as the clay; Kunipia P, made by Kunimine Industries), and this was put into a sealed plastic vessel along with a Teflon® agitator and shaken vigorously, which gave a uniform dispersion. To this dispersion was added epsilon-caprolactam powder (as a nylon monomer; made by Wako Pure Chemical Industries) to prepare a uniform dispersion. The weight ratio of the natural montmorillonite to the epsilon-caprolactam here was 0.90 g/0.10 g (10% caprolactam), 0.80 g/0.20 g (20% caprolactam), and 0.70 g/0.30 g (30% caprolactam). This dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform nylon monomer composite clay thin film with a thickness of approximately 30 μm. The clay thin film thus produced was peeled from the tray and heat treated for 5 hours in a heating oven held at 250° C.

Figure 17:
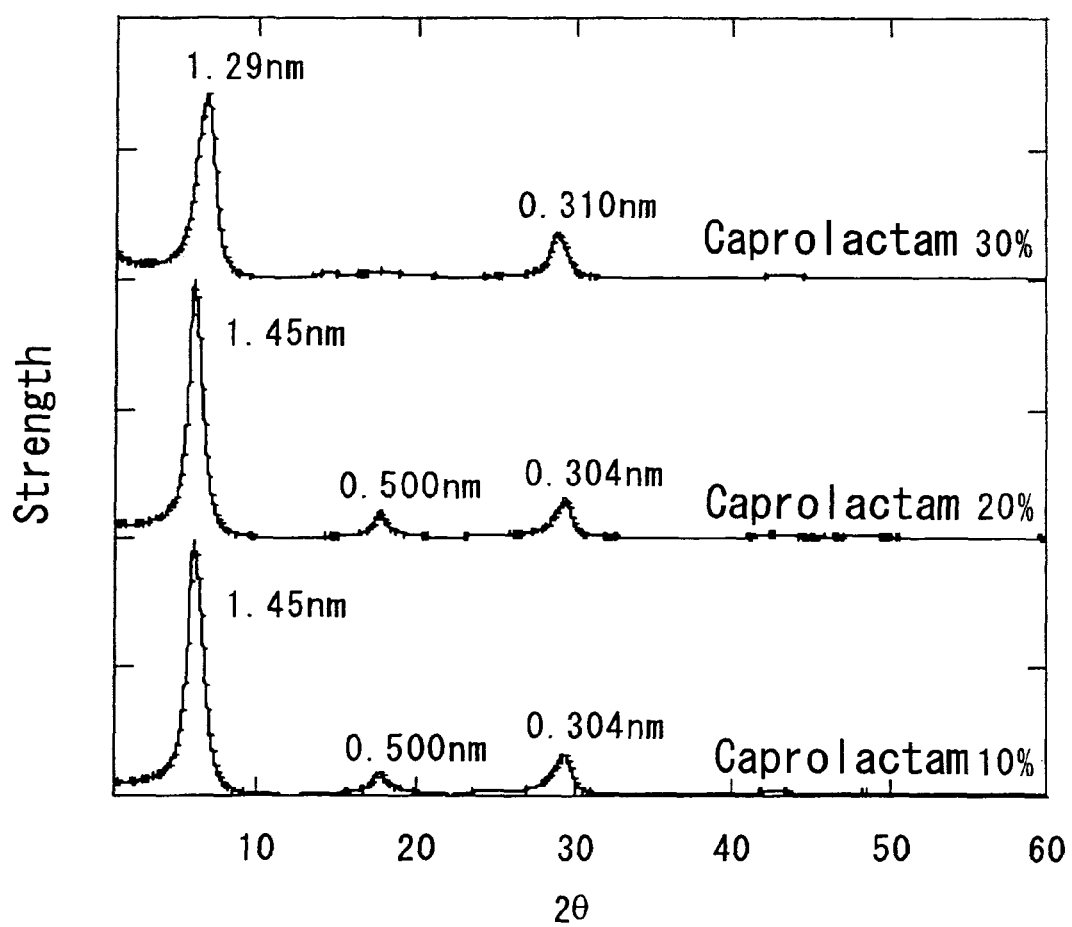
FIG. 17 is an X-ray diffraction chart of a nylon composite clay thin film when the added amount of epsilon-caprolactam is varied.

FIG. 17 is an X-ray diffraction chart of the nylon composite clay film after heat treatment at 250° C. The back reflection peaks 001 of the 10% caprolactam and 20% caprolactam were both observed at a position of d=1.45 nm. These were spread out more than the 1.24 nm value of a clay thin film (Kunipia P thin film), and correspond to structures in which a nylon monomer and nylon are incorporated between layers of montmorillonite (Kunipia P). These results tell us that the nylon monomer and nylon are present between layers of montmorillonite (Kunipia P), and are included in the clay layers. Meanwhile, the back reflection peak 001 of the 30% caprolactam was observed at d=129 nm, and it can be seen that the peak is wide. This indicates that the orientation of the clay particles in the composite film is somewhat lower than in the other samples.

EXAMPLE 18

60 cc of distilled water was added to 0.95 g of synthetic saponite (as the clay; Smectone, made by Kunimine Industries), and this was put into a sealed plastic vessel along with a Teflon® agitator and shaken vigorously, which gave a uniform dispersion. To this dispersion was added 0.05 g of epsilon-caprolactam powder (made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 μm. Observation by electron microscope revealed that the metal sheet and the clay thin film interfaces were in contact, with no gap in between, so the film did not peel away when merely touched by hand.

EXAMPLE 19

60 cc of distilled water was added to 1 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 1 cc of an aqueous solution containing a specific proportion of sodium polyacrylate (as a water-soluble polymer; made by Wako Pure Chemical Industries, degree of polymerization 2700 to 7500), which gave a dispersion containing natural montmorillonite and sodium polyacrylate. The specific proportion here was varied to produce dispersions with different weight proportions of natural montmorillonite and sodium polyacrylate. The weight ratio of natural montmorillonite to sodium polyacrylate ranged from 0.90 g/0.2 g (2% sodium polyacrylate) to 1.00 g/0.0000002 g (0.00002% sodium polyacrylate). Next, each dispersion containing natural montmorillonite and sodium polyacrylate was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform water-soluble polymer composite clay thin film with a thickness of approximately 30 μm. The composite clay thin film thus produced was peeled from the tray, which gave a water-soluble polymer composite clay thin film that was self-supporting (self-standing) and had excellent flexibility. This film was also heat treated for 24 hours at 500° C.

Figure 18:
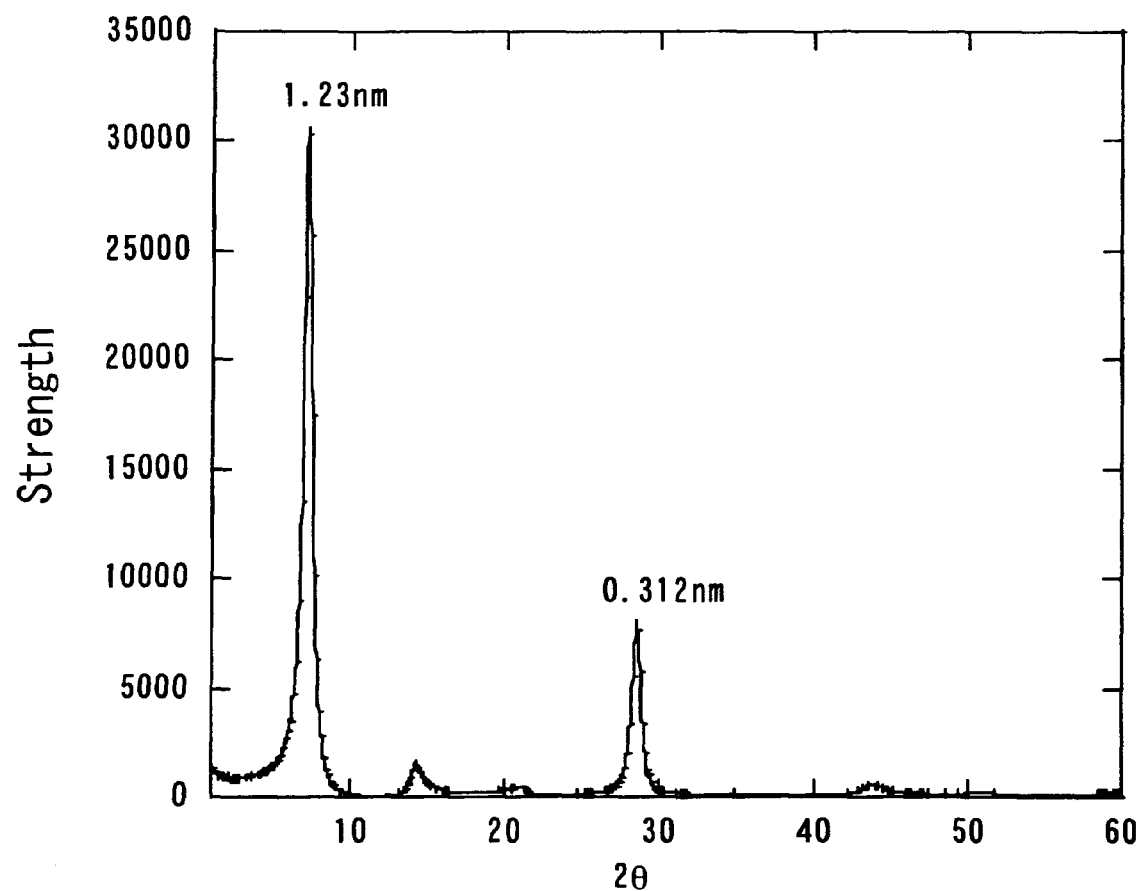
FIG. 18 is an X-ray diffraction chart of the composite clay thin film of the present invention prepared using a polyacrylate (weight ratio of sodium polyacrylate used here to the total solids: 0.02%)
Figure 19:
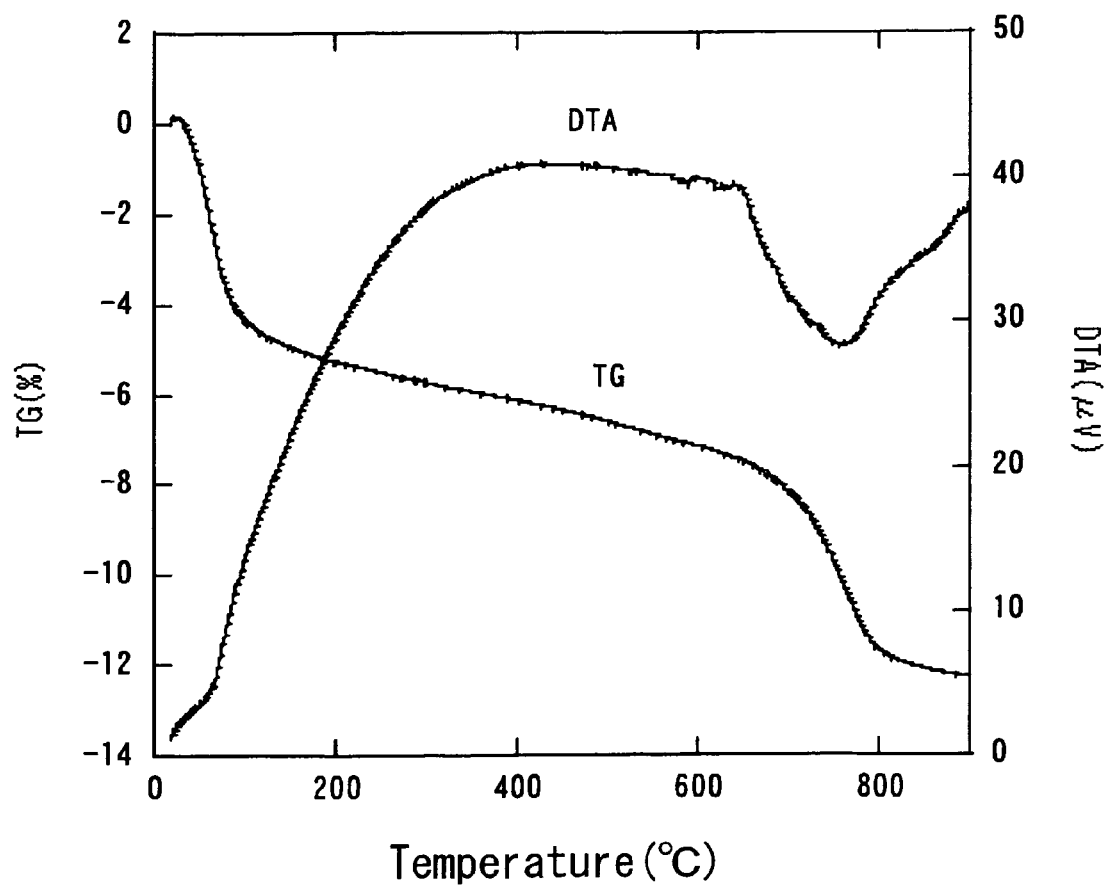
FIG. 19 is a TG-DTA chart of the composite clay thin film of the present invention prepared using a polyacrylate (weight ratio of sodium polyacrylate used here to the total solids: 0.02%) (temperature elevation rate: 5° C./minute, under an argon atmosphere)

FIG. 18 is an X-ray diffraction chart of a polyacrylate composite clay film (0.02% sodium polyacrylate) before heat treatment. A back reflection peak 001 was observed at d=1.23 nm in this X-ray diffraction chart. This peak is higher in intensity and narrower in width than the typical back reflection peak of this type of clay mineral. It can be seen from these results that montmorillonite crystals are oriented in layers in the composite clay thin films obtained using a polyacrylate. It can be seen that the back reflection peak intensity was particularly high with the composite clay thin films obtained using sodium polyacrylate in an amount of from 0.005% to 0.1%, and that the montmorillonite crystals are highly oriented. Out of these composite clay thin films, FIG. 19 is a TG-DTA chart (temperature elevation rate: 5° C./minute, under an argon atmosphere) for the polyacrylate composite clay thin film containing 0.02% sodium polyacrylate. The TG curve in FIG. 19 shows a reduction in weight caused by the dehydration of adsorbed water from room temperature up to 200° C., and a large weight reduction in montmorillonite was observed from 700 to 800° C. No thermal change or thermal weight change whatsoever could be observed in between these temperatures. This indicates that a composite clay thin film obtained using a polyacrylate exhibits high heat resistance.

The air permeation coefficients of composite clay thin films with different proportions of polyacrylate were measured with a Gasperm-100 made by JASCO. The weight ratios of the natural montmorillonite and sodium polyacrylate used in the preparation of the composite thin films here were 0.99 g/0.002 g (0.2% sodium polyacrylate), 1.00 g/0.0002 g (0.02% sodium polyacrylate), 1.00 g/0.00002 g(0.002% sodium polyacrylate), 1.00 g/0.000002 g (0.0002% sodium polyacrylate), and 1.00 g/0.0000002 g (0.00002% sodium polyacrylate). The air permeation coefficient at room temperature for all the composite thin films was confirmed to be less than $3.2 \times 10^{-11}$ $cm^2 s^{-1} cmHg^{-1}$, which tells us that the films exhibit gas barrier performance. After these composite thin films were heated for 24 hours at 500° C., the air permeation coefficient at room temperature was confirmed for all films to be less than $3.2 \times 10^{-11}$ $cm^2 s^{-1} cmHg^{-1}$, which tells us that the films exhibit gas barrier performance even after high-temperature treatment.

EXAMPLE 20

60 cc of distilled water was added to 0.95 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.05 g of polyvinyl alcohol (as a water-soluble polymer; made by Kanto Chemical, degree of polymerization approximately 500). This dispersion containing natural montmorillonite and polyvinyl alcohol was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using polyvinyl alcohol was measured with a Gasperm-100 made by JASCO and found to be less than $3.2 \times 10^{-11}$ $cm^2 s^{-1} cmHg^{-1}$, which tells us that the film exhibits gas barrier performance. Also, the air permeation coefficient at room temperature of the film after heat treatment for 24 hours at 500° C. was confirmed to be less than $3.2 \times 10^{-11}$ $cm^2 s^{-1} cmHg^{-1}$, which tells us that the film exhibits gas barrier performance even after high-temperature treatment.

EXAMPLE 21

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of starch (as a water-soluble polymer; made by Nacalai Tesque). This dispersion containing natural montmorillonite and starch was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using starch was measured with a Gasperm-100 made by JASCO and found to be less than $3.2 \times 10^{-11}$ $cm^2 s^{-1} cmHg^{-1}$, which tells us that the film exhibits gas barrier performance.

EXAMPLE 22

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of hydroxyethyl cellulose (as a water-soluble polymer; made by Aldrich Chemical Company). This dispersion containing natural montmorillonite and hydroxyethyl cellulose was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using hydroxyethyl cellulose was measured with a Gasperm-100 made by JASCO and found to be less than $3.2 \times 10^{-11}$ $cm^2 s^{-1} cmHg^{-1}$, which tells us that the film exhibits gas barrier performance.

EXAMPLE 23

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of gelatin (as a water-soluble polymer; made by Wako Pure Chemical Industries). This dispersion containing natural montmorillonite and gelatin was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using gelatin was measured with a Gasperm-100 made by JASCO and found to be less than $3.2 \times 10^{-11}$ $cm^2 s^{-1} cmHg^{-1}$, which tells us that the film exhibits gas barrier performance.

EXAMPLE 24

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was 0.01 g of gluten (as a water-soluble polymer; made by Wako Pure Chemical Industries). This dispersion containing natural montmorillonite and gluten was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using gluten was measured with a Gasperm-100 made by JASCO and found to be less than $3.2\times10^{-11}$ $cm^2s^{-1}cmHg^{-1}$, which tells us that the film exhibits gas barrier performance.

EXAMPLE 25

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyethylene glycol (as a water-soluble polymer; made by Tokyo Kasei Kogyo). This dispersion containing natural montmorillonite and polyethylene glycol was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using polyethylene glycol was measured with a Gasperm-100 made by JASCO and found to be less than $3.2\times10^{-11}$ $cm^2s^{-1}cmHg^{-1}$, which tells us that the film exhibits gas barrier performance.

EXAMPLE 26

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyacrylamide (as a water-soluble polymer; made by Aldrich Chemical Company). This dispersion containing natural montmorillonite and polyacrylamide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using polyacrylamide was measured with a Gasperm-100 made by JASCO and found to be less than $3.2\times10^{-11}$ $cm^2s^{-1}cmHg^{-1}$, which tells us that the film exhibits gas barrier performance.

EXAMPLE 27

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyethylene oxide (as a water-soluble polymer; made by Aldrich Chemical Company). This dispersion containing natural montmorillonite and polyethylene oxide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using polyethylene oxide was measured with a Gasperm-100 made by JASCO and found to be less than $3.2\times10^{-11}$ $cm^2s^{-1}cmHg^{-1}$, which tells us that the film exhibits gas barrier performance.

EXAMPLE 28

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 0.01 g of a powder of deoxyribonucleic acid (as a water-soluble polymer; made by Tokyo Kasei Kogyo). This dispersion containing natural montmorillonite and deoxyribonucleic acid was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using deoxyribonucleic acid was measured with a Gasperm-100 made by JASCO and found to be less than $3.2\times10^{-11}$ $cm^2s^{-1}cmHg^{-1}$, which tells us that the film exhibits gas barrier performance.

EXAMPLE 29

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 0.01 g of a powder of poly-L-lysine hydrobromide (as a water-soluble polymer; made by ICN Biochemicals). This dispersion containing natural montmorillonite and poly-L-lysine hydrobromide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The composite clay thin film thus produced was then peeled from the tray.

The air permeation coefficient at room temperature of the composite clay thin film obtained using poly-L-lysine hydrobromide was measured with a Gasperm-100 made by JASCO and found to be less than $3.2 \times 10^{-11}$ cm$^2$s$^{-1}$cmHg$^{-1}$, which tells us that the film exhibits gas barrier performance.

EXAMPLE 30

60 cc of distilled water was added to 1.0 g of Kunipia P (as the clay; a natural montmorillonite made by Kunimine Industries), and this was put into a sealed plastic vessel along with a Teflon® agitator and shaken vigorously, which gave a uniform dispersion. This dispersion was poured into a flat-bottomed polypropylene tray that had a square bottom measuring about 10 cm on each side. With the tray held horizontal, the dispersion was dried for 5 hours at a temperature of 50° C. in a forced air oven, which gave a semi-transparent thin film with a thickness of approximately 40 µm. This film was then heat treated for 24 hours at 1000° C.

In differential thermal analysis (temperature elevation rate: 5° C./minute) of this clay thin film, the weight reduction over a temperature range of 200° C. to 600° C. was 3.7%, and the fact that this weight reduction was so small tells us that the basic structure of the clay constituting a gas blocking material is not affected by heating up to 600° C.

The air permeation coefficient of the thin film was measured with a Gasperm-100 made by JASCO. As a result, the permeation coefficients for air, oxygen gas, nitrogen gas, hydrogen gas, and helium gas at room temperature were all confirmed to be less than $3.2 \times 10^{-11}$ cm$^2$s$^{-1}$cmHg$^{-1}$, which tells us that the film exhibits gas barrier performance. Molecules of helium gas are smaller than those of any other gas, and since this thin film has high gas barrier performance against helium gas, it is believed that this thin film will exhibit high gas barrier performance against all gases, regardless of the type. Also, the air permeation coefficient of a thin film that had been heat treated for 24 hours at 1000° C. was measured and found to be less than $3.2 \times 10^{-11}$ cm$^2$s$^{-1}$cmHg$^{-1}$, meaning that heat treatment was not observed to reduce gas barrier performance.

Next, the water permeation coefficient of this thin film was measured to confirm its water blocking performance. The water permeation coefficient was measured using a type D universal water permeation coefficient measurement apparatus made by Hojun. As a result, the water permeation coefficient of this thin film was found to be $1 \times 10^{-11}$ cm/sec, which means that the film exhibits water blocking performance.

60 cc of distilled water was added to 1 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 1 cc of an aqueous solution containing a specific proportion of sodium polyacrylate (as a water-soluble polymer; made by Wako Pure Chemical Industries, degree of polymerization 2700 to 7500), which gave a dispersion containing natural montmorillonite and sodium polyacrylate. The specific proportion here was varied to produce dispersions with different weight proportions of natural montmorillonite and sodium polyacrylate. The weight ratio of natural montmorillonite to sodium polyacrylate ranged from 0.98 g/0.02 g (2% sodium polyacrylate) to 1.00 g/0.0000002 g (0.00002% sodium polyacrylate). Next, each dispersion containing natural montmorillonite and sodium polyacrylate was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform water-soluble polymer composite clay thin film with a thickness of approximately 30 µm. The composite clay thin film thus produced was peeled from the tray, which gave a water-soluble polymer composite clay thin film that was self-supporting and had excellent flexibility. This film was also heat treated for 24 hours at 500° C.

Figure 20:
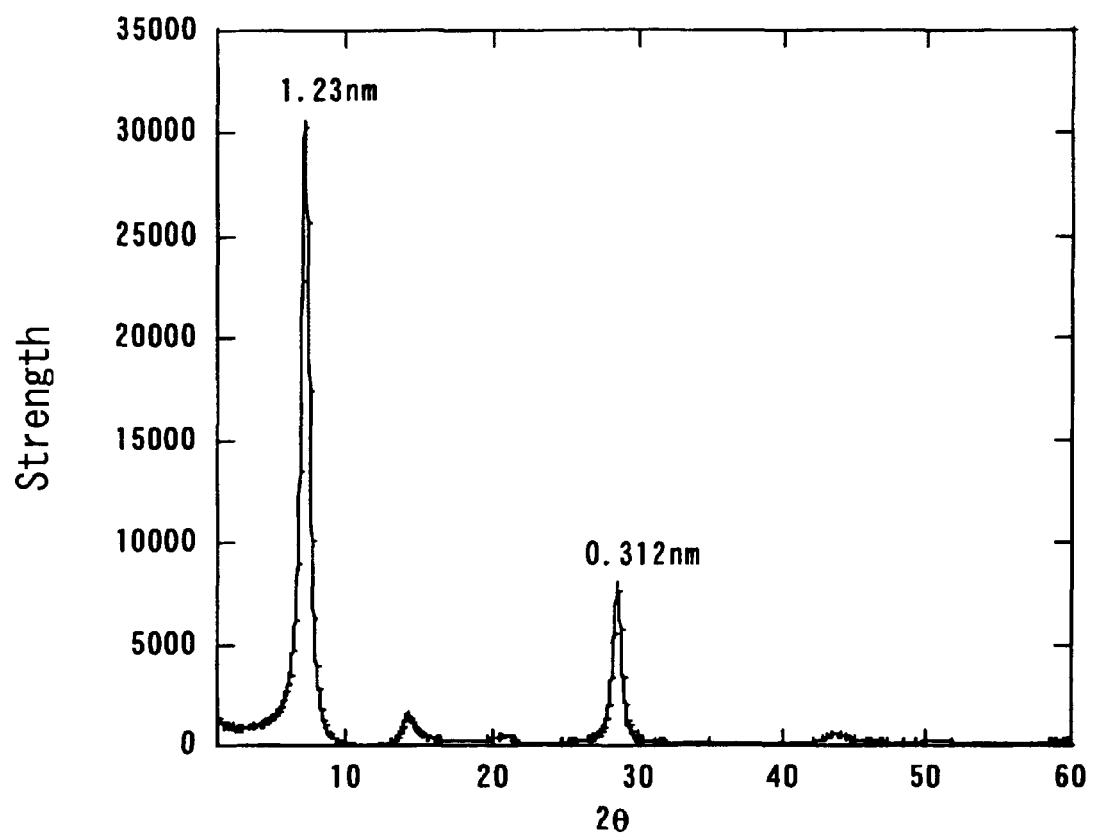
FIG. 20 is an X-ray diffraction chart of the composite clay thin film of the present invention prepared using a polyacrylate (weight ratio of sodium polyacrylate used here to the total solids: 0.02%)
Figure 21:
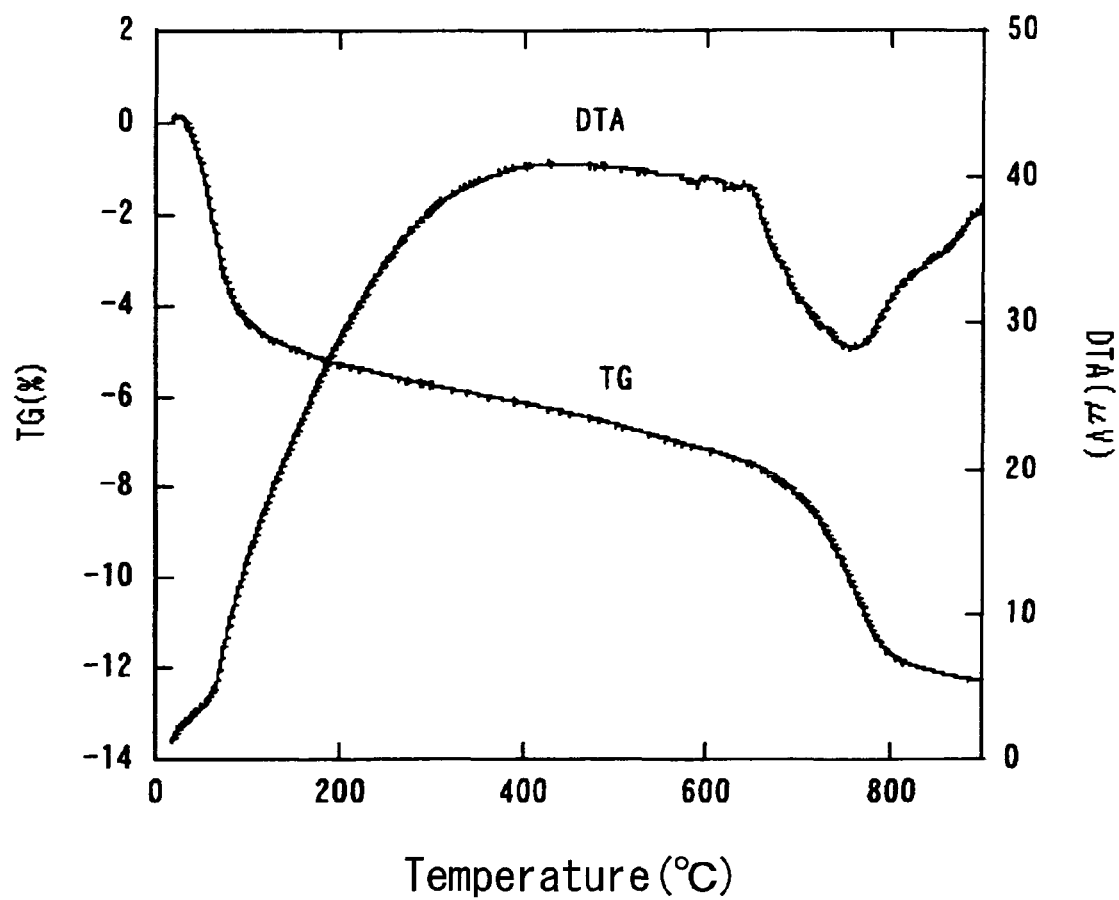
FIG. 21 is a TG-DTA chart of the composite clay thin film of the present invention prepared using a polyacrylate (weight ratio of sodium polyacrylate used here to the total solids: 0.02%) (temperature elevation rate: 5° C./minute, under an argon atmosphere)

In differential thermal analysis (temperature elevation rate: 5° C./minute) of this sodium polyacrylate composite clay thin film, the weight reduction over a temperature range of 200° C. to 600° C. was 3.3%, and the fact that this weight reduction was so small tells us that the basic structure of the clay constituting a gas blocking material is not affected by heating up to 600° C. FIG. 20 is an X-ray diffraction chart of a polyacrylate composite clay thin film (0.02% sodium polyacrylate) prior to heat treatment. A back reflection peak 001 was observed at d=1.23 nm in this X-ray diffraction chart. This peak is higher in intensity and narrower in width than the typical back reflection peak of this type of clay mineral. It can be seen from these results that montmorillonite crystals are oriented in layers in the composite clay thin films obtained using a polyacrylate. It can be seen that the back reflection peak intensity was particularly high with the composite clay thin films obtained using sodium polyacrylate in an amount of from 0.005% to 0.1%, and that the montmorillonite crystals are highly oriented. Out of these composite clay thin films, FIG. 21 is a TG-DTA chart (temperature elevation rate: 5° C./minute, under an argon atmosphere) for the polyacrylate composite clay thin film containing 0.02% sodium polyacrylate. The TG curve in FIG. 21 shows a reduction in weight caused by the dehydration of adsorbed water from room temperature up to 200° C., and a large weight reduction in montmorillonite was observed from 700 to 800° C. No thermal change or thermal weight change whatsoever could be observed in between these temperatures. This indicates that a composite clay thin film obtained using a polyacrylate exhibits high heat resistance.

The air permeation coefficients of composite clay thin films with different proportions of polyacrylate were measured with a Gasperm-100 made by JASCO. The weight ratios of the natural montmorillonite and sodium polyacrylate used in the preparation of the composite thin films here were 0.99 g/0.002 g (0.2% sodium polyacrylate), 1.00 g/0.0002 g (0.02% sodium polyacrylate), 1.00 g/0.00002 g (0.002% sodium polyacrylate), 1.00 g/0.000002 g (0.0002% sodium polyacrylate), and 1.00 g/0.0000002 g (0.00002% sodium polyacrylate). The air permeation coefficient at room temperature for all the composite thin films was confirmed to be less than $3.2 \times 10^{-11}$ cm$^2$s$^{-1}$cmHg$^{-1}$, which tells us that the films exhibit gas barrier performance. After these composite thin films were heated for 24 hours at 500° C., the air permeation coefficient at room temperature was confirmed for all films to be less than $3.2 \times 10^{-11}$ cm$^2$s$^{-1}$cmHg$^{-1}$, which tells us that the films exhibit gas barrier performance even after high-temperature treatment.

EXAMPLE 31

60 cc of distilled water was added to 0.95 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added 0.05 g of epsilon-caprolactam powder (as a nylon monomer; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform nylon monomer composite clay thin film with a thickness of approximately 30 μm. The clay thin film thus produced was peeled from the tray and heat treated for 5 hours in a heating oven held at 250° C., which gave a nylon composite clay film.

In differential thermal analysis (temperature elevation rate: 5° C./minute) of this nylon composite clay thin film, the weight reduction over a temperature range of 200° C. to 600° C. was 2.6%, and the fact that this weight reduction was so small tells us that the basic structure of the clay constituting a gas blocking material is not affected by heating up to 600° C.

The air permeation coefficient of the nylon composite clay film (the weight ratio of nylon monomer to total solids was 5%) was measured with a Gasperm-100 made by JASCO and confirmed to be less than $3.2\times10^{-11}$ $cm^2s^{-1}cmHg^{-1}$, at room temperature, which tells us that the film exhibits gas barrier performance. The air permeation coefficient of the film after heat treatment for 24 hours at 500° C. was confirmed to be less than $3.2\times10^{-11}$ $cm^2s^{-1}cmHg^{-1}$, at room temperature, which tells us that the film exhibits gas barrier performance even after high-temperature treatment.

EXAMPLE 32

60 cc of distilled water was added to 0.95 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.05 g of polyvinyl alcohol (as a water-soluble polymer; made by Kanto Chemical, degree of polymerization approximately 500). This dispersion containing natural montmorillonite and polyvinyl alcohol was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using polyvinyl alcohol was measured with a Gasperm-100 made by JASCO and found to be less than $3.2\times10^{-11}$ $cm^2s^{-1}cmHg^{-1}$, which tells us that the film exhibits gas barrier performance. Also, the air permeation coefficient at room temperature of the film after heat treatment for 24 hours at 500° C. was confirmed to be less than $3.2\times10^{-11}$ $cm^2s^{-1}cmHg^{-1}$, which tells us that the film exhibits gas barrier performance even after high-temperature treatment.

EXAMPLE 33

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of starch (as a water-soluble polymer; made by Nacalai Tesque). This dispersion containing natural montmorillonite and starch was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using starch was measured with a Gasperm-100 made by JASCO and found to be less than $3.2\times10^{-11}$ $cm^2s^{-1}cmHg^{-1}$, which tells us that the film exhibits gas barrier performance.

EXAMPLE 34

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of hydroxyethyl cellulose (as a water-soluble polymer; made by Aldrich Chemical Company). This dispersion containing natural montmorillonite and hydroxyethyl cellulose was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using hydroxyethyl cellulose was measured with a Gasperm-100 made by JASCO and found to be less than $3.2\times10^{-11}$ $cm^2s^{-1}cmHg^{-1}$, which tells us that the film exhibits gas barrier performance.

EXAMPLE 35

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of gelatin (as a water-soluble polymer; made by Wako Pure Chemical Industries). This dispersion containing natural montmorillonite and gelatin was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using gelatin was measured with a Gasperm-100 made by JASCO and found to be less than $3.2\times10^{-11}$ $cm^2s^{-1}cmHg^{-1}$, which tells us that the film exhibits gas barrier performance.

EXAMPLE 36

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of gluten (as a water-soluble polymer; made by Wako Pure Chemical Industries). This dispersion containing natural montmorillonite and gluten was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using gluten was measured with a Gasperm-100 made by JASCO and found to be less than $3.2\times10^{-11}$ $cm^2s^{-1}cmHg^{-1}$, which tells us that the film exhibits gas

EXAMPLE 37

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyethylene glycol (as a water-soluble polymer; made by Tokyo Kasei Kogyo). This dispersion containing natural montmorillonite and polyethylene glycol was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using polyethylene glycol was measured with a Gasperm-100 made by JASCO and found to be less than $3.2\times10^{-11}$ $cm^2s^{-1}cmHg^{-1}$, which tells us that the film exhibits gas barrier performance.

EXAMPLE 38

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyacrylamide (as a water-soluble polymer; made by Aldrich Chemical Company). This dispersion containing natural montmorillonite and polyacrylamide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using polyacrylamide was measured with a Gasperm-100 made by JASCO and found to be less than $3.2\times10^{-11}$ $cm^2s^{-1}cmHg^{-1}$, which tells us that the film exhibits gas barrier performance.

EXAMPLE 39

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 1 cc of an aqueous solution containing 0.01 g of polyethylene oxide (as a water-soluble polymer; made by Aldrich Chemical Company). This dispersion containing natural montmorillonite and polyethylene oxide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using polyethylene oxide was measured with a Gasperm-100 made by JASCO and found to be less than $3.2\times10^{-11}$ $cm^2s^{-1}cmHg^{-1}$, which tells us that the film exhibits gas barrier performance.

EXAMPLE 40

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 0.01 g of a powder of deoxyribonucleic acid (as a water-soluble polymer; made by Tokyo Kasei Kogyo). This dispersion containing natural montmorillonite and deoxyribonucleic acid was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 μm. The composite clay thin film thus produced was then peeled from the tray.

The air permeation coefficient at room temperature of the composite clay thin film obtained using deoxyribonucleic acid was measured with a Gasperm-100 made by JASCO and found to be less than $3.2\times10^{-11}$ $cm^2s^{-1}cmHg^{-1}$, which tells us that the film exhibits gas barrier performance.

EXAMPLE 41

60 cc of distilled water was added to 0.99 g of natural montmorillonite (as the clay; Kunipia P, made by Kunimine Industries), and this was put into a sealed plastic vessel along with a Teflon® agitator and shaken vigorously, which gave a uniform dispersion. Into this dispersion was mixed 0.01 g of a powder of poly-L-lysine hydrobromide (as a water-soluble polymer; made by ICN Biochemicals). This dispersion containing natural montmorillonite and poly-L-lysine hydrobromide was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C.

in a forced air oven, which gave a uniform composite clay thin film with a thickness of approximately 30 µm. The composite clay thin film thus produced was then peeled from the tray.

The air permeation coefficient at room temperature of the composite clay thin film obtained using poly-L-lysine hydrobromide was measured with a Gasperm-100 made by JASCO and found to be less than $3.2\times10^{-11}$ cm$^2$s$^{-1}$cmHg$^{-1}$, which tells us that the film exhibits gas barrier performance.

EXAMPLE 42

60 cc of distilled water was added to 0.95 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added an aqueous solution containing 0.05 g of epsilon-caprolactam (as a water-soluble polymer; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 30 µm. The clay thin film thus produced was peeled from the tray to obtain a composite clay film.

Figure 22:
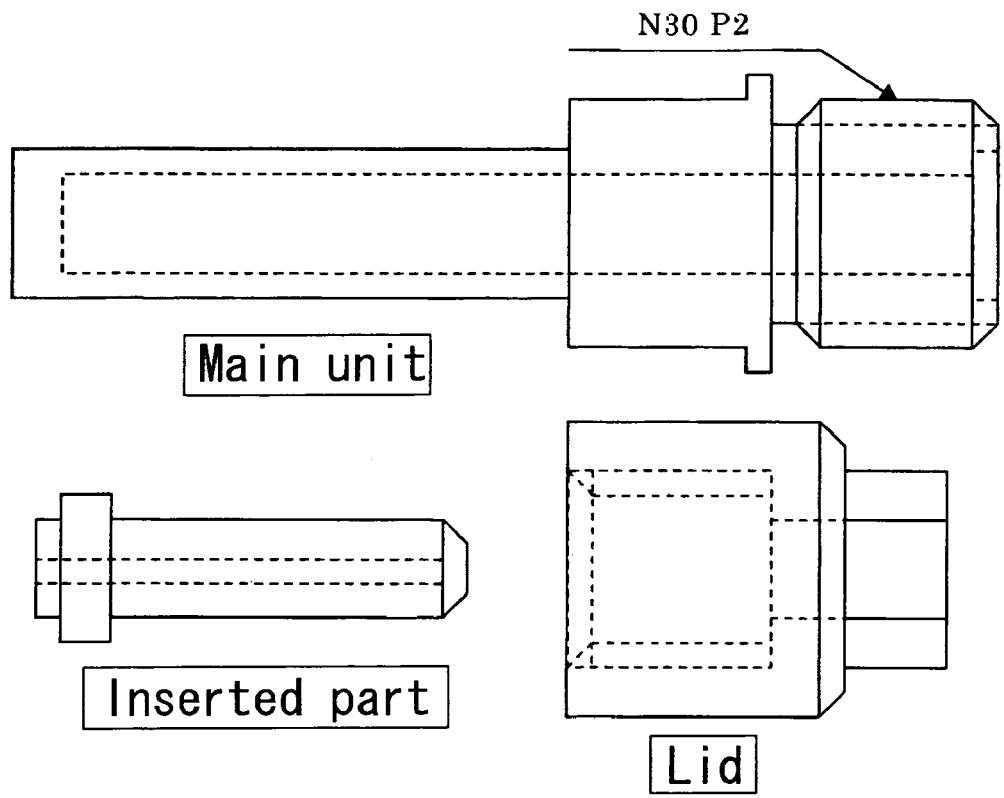
FIG. 22 is a side view of the structure of an autoclave.
Figure 23:
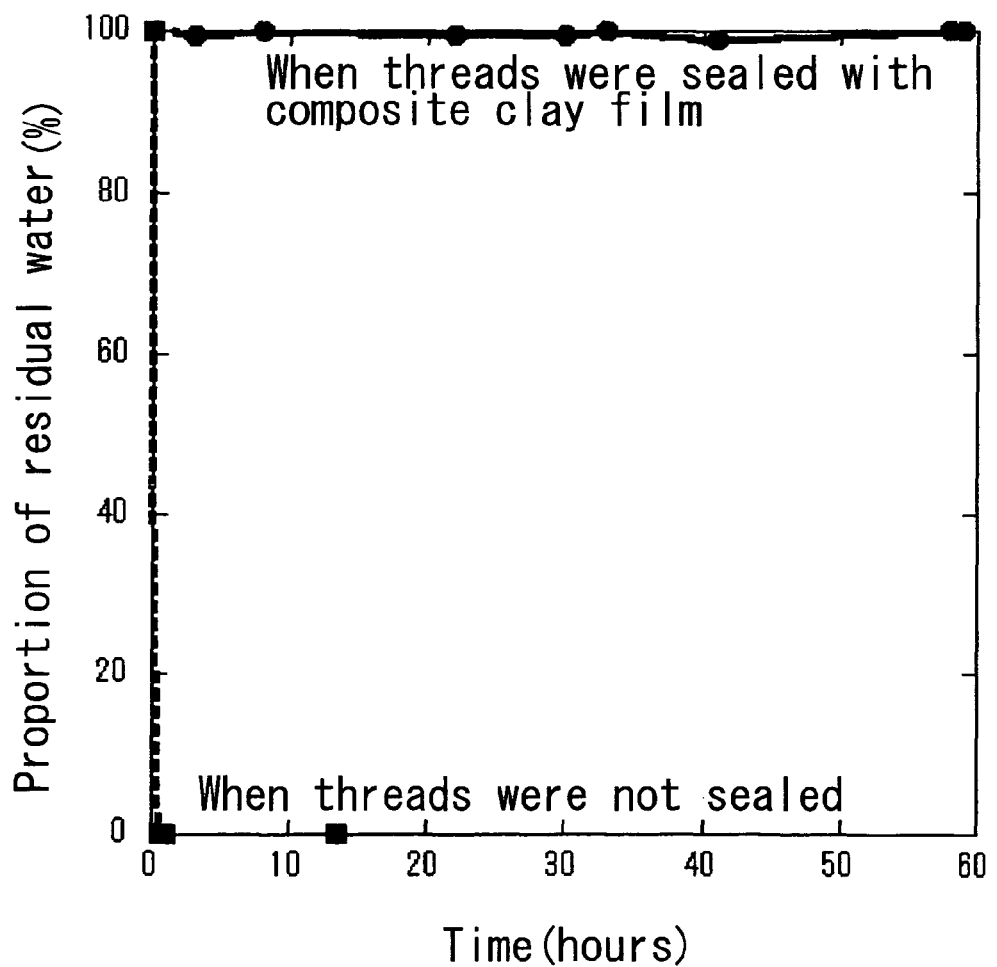
FIG. 23 is a graph of how the proportion of water remaining in an autoclave that was put in an electric furnace held at 300° C., changed over time versus the initial amount when a threaded component was and was not sealed with a composite clay film.

The composite clay film thus obtained was cut to a length of 10 cm and a width of 2 cm, and wrapped around the thread components (N30, P2) of the autoclave (made of SUS 316, internal volume of 30 cc) shown in FIG. 22. Next, 20 cc of distilled water was put into the autoclave, and the inserted part was fastened by screwing down the lid with a wrench. This autoclave was then placed in an electric furnace held at 300° C., the change in the weight of the autoclave over time was measured, and the remainder ratio versus the initial value for water was calculated from this change. FIG. 23 shows the relationship between elapsed time and the water remainder ratio. When the composite clay film was wrapped around the threads, the water content remained unchanged for 72 hours, and barrier performance against high-temperature and high-pressure steam was exhibited.

Comparative Example 2

20 cc of distilled water was put into the autoclave (made of SUS 316, internal volume of 30 cc) shown in FIG. 22, and the inserted part was fastened by screwing down the lid with a wrench. This autoclave was then placed in an electric furnace held at 300° C., the change in the weight of the autoclave over time was measured, and the remainder ratio versus the initial value for water was calculated from this change. FIG. 23 shows the relationship between elapsed time and the water remainder ratio. All of the water in the autoclave had been lost after 45 minutes.

EXAMPLE 43

60 cc of distilled water was added to 0.32 g of natural montmorillonite (as the clay; Kunipia P, made by Kunimine Industries), and this was put into a sealed plastic vessel along with a Teflon® agitator and shaken vigorously, which gave a uniform dispersion. To this dispersion was added an aqueous solution containing 0.017 g of epsilon-caprolactam (as a water-soluble polymer; made by Wako Pure Chemical Industries), and this dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform composite clay thin film with a thickness of approximately 10 µm. The clay thin film thus produced was peeled from the tray to obtain a composite clay film.

Figure 24:
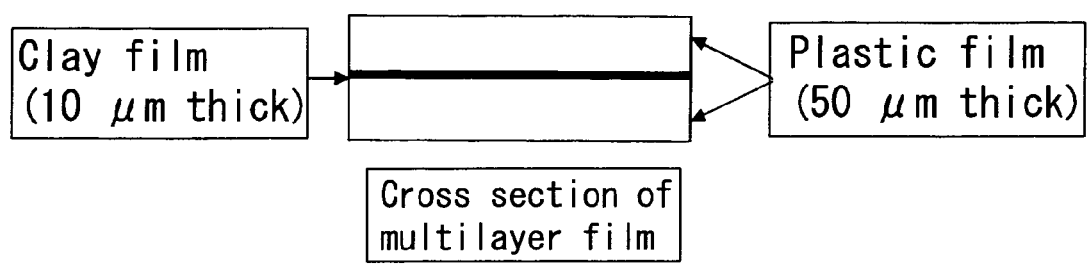
FIG. 24 is a diagram of the cross sectional structure of a multilayer film.

The composite clay film thus obtained was cut to a suitable size, sandwiched between two plastic films as shown in FIG. 24, and these films were bonded together with an adhesive to produce a three-layer film. The plastic films were made of a fluororesin (tetrafluoroethylene), and the thickness of one layer was 50 µm. The helium permeation coefficient of this multilayer film was measured with a Gasperm-100 made by JASCO and confirmed to be less than $5.9\times10^{-11}$ cm$^2$s$^{-1}$cmHg$^{-1}$ at room temperature, which tells us that the multilayer film exhibits gas barrier performance.

Comparative Example 3

Figure 25:
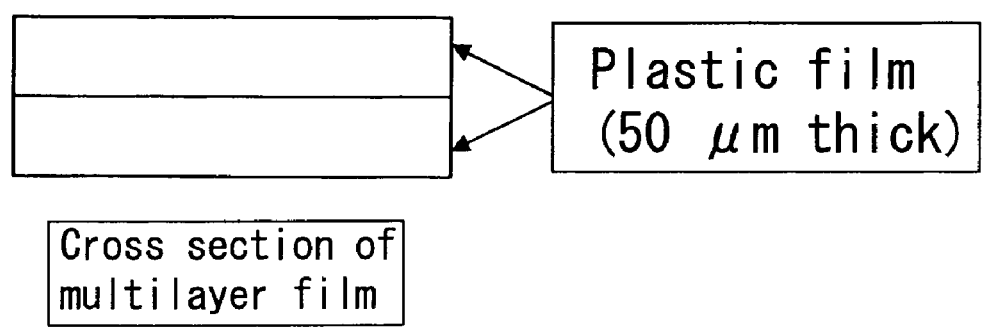
FIG. 25 is a diagram of the cross sectional structure of a multilayer film.

As shown in FIG. 25, two plastic films were bonded together with an adhesive to produce a two-layer film. The plastic films were made of a fluororesin (tetrafluoroethylene), and the thickness of one layer was 50 µm. The helium permeation coefficient of this multilayer film was measured with a Gasperm-100 made by JASCO and confirmed to be $1.1\times10^{-19}$ cm$^2$s$^{-1}$cmHg$^{-1}$ at room temperature.

EXAMPLE 44

60 cc of distilled water was added to 0.95 g of Smectone (as the clay; a synthetic saponite made by Kunimine Industries), and this was put into a sealed plastic vessel along with a Teflon® agitator and shaken vigorously, which gave a uniform dispersion. This dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a semi-transparent, circular clay thin film with a thickness of approximately 30 µm. Observation by electron microscope revealed that the metal sheet and the clay thin film interfaces were in contact, with no gap in between, so the film did not peel away when merely touched by hand.

EXAMPLE 45

60 cc of distilled water was added to 1.0 g of Kunipia P (as the clay; a natural montmorillonite made by Kunimine Industries), and this was put into a sealed plastic vessel along with a Teflon® agitator and shaken vigorously, which gave a uniform clay dispersion. This clay dispersion was poured onto a flat-bottomed stainless steel support that had a square bottom measuring about 10 cm on each side, and the clay dispersion was allowed to stand horizontally so that the clay particles would gradually settle. With the support held horizontal, the dispersion was dried for 5 hours at a temperature of 50° C. in a forced air oven, which gave a semi-transparent clay thin film/support with a thickness of approximately 40 µm.

Figure 26:
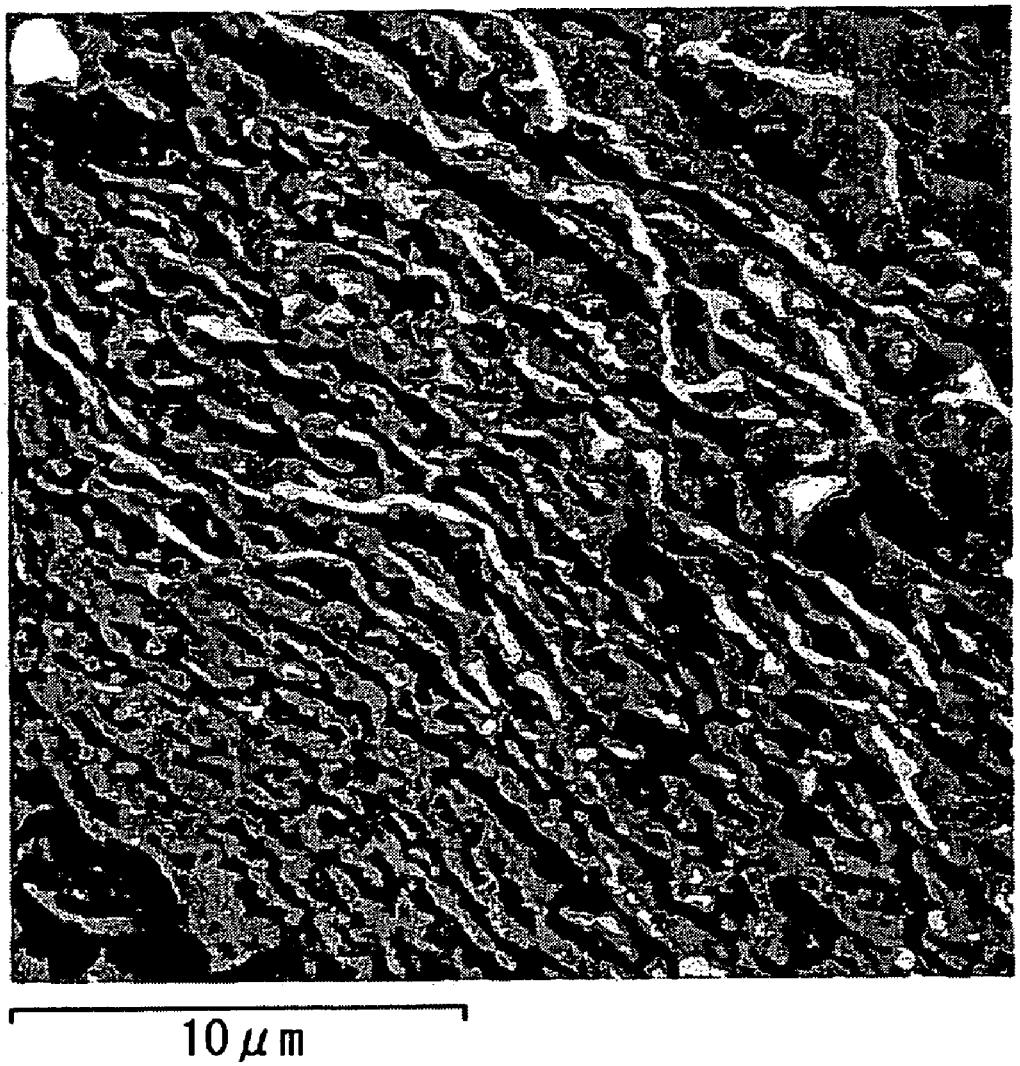
FIG. 26 is a scanning electron micrograph of a Kunipia P clay thin film.
Figure 27:
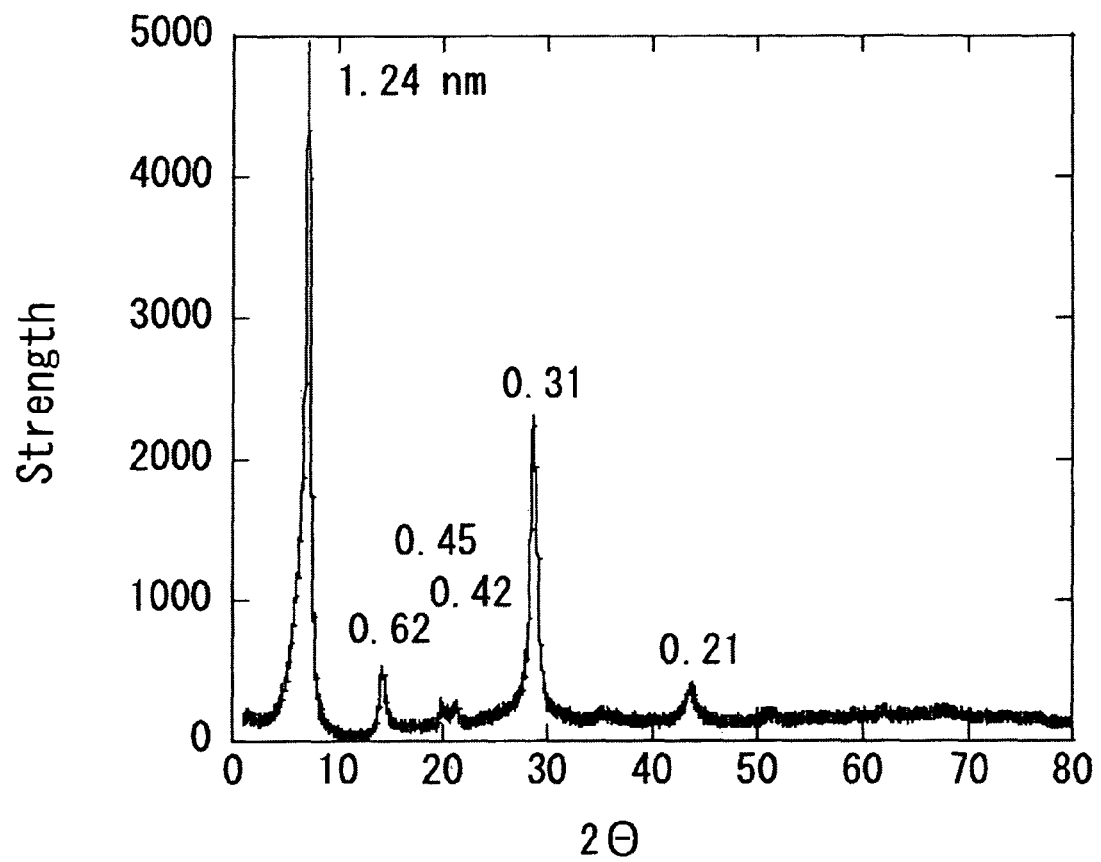
FIG. 27 is an X-ray diffraction chart of a Kunipia P clay thin film.

FIG. 26 shows a scanning electron micrograph of this clay thin film. It can be seen in FIG. 26 how highly oriented the clay particles are. FIG. 27 is an X-ray diffraction chart of this clay thin film. A series of sharp back reflection peaks (001), (002), (003), (004), and (005) are seen at positions of 1.24, 0.62, 0.42, 0.31, and 0.21 nm, respectively, indicating that the orientation of the particles in the clay thin film is very uniform.

EXAMPLE 46

60 cc of distilled water was added to magnesium Kunipia P (as the clay), obtained by exchanging the exchangeable ions of 1.0 g of natural montmorillonite (Kunipia P made by Kunimine Industries) with magnesium, and this was put into a sealed plastic vessel along with a Teflon® agitator and shaken vigorously, which gave a uniform clay dispersion. This clay dispersion was poured onto a flat-bottomed stainless steel support that had a square bottom measuring about 10 cm on each side, and the clay dispersion was allowed to stand horizontally so that the clay particles would gradually settle. With the support held horizontal, the dispersion was dried for 5 hours at a temperature of 50° C. in a forced air oven, which gave a semi-transparent clay thin film/support with a thickness of approximately 70 µm.

EXAMPLE 47

60 cc of distilled water was added to 1.0 g of Smectone (as the clay; a synthetic saponite made by Kunimine Industries), and this was put into a sealed plastic vessel along with a Teflon® agitator and shaken vigorously, which gave a uniform clay dispersion. This clay dispersion was poured onto a flat-bottomed stainless steel support that had a square bottom measuring about 10 cm on each side, and the clay dispersion was allowed to stand horizontally so that the clay particles would gradually settle. With the support held horizontal, the dispersion was dried for 5 hours at a temperature of 50° C. in a forced air oven, which gave a semi-transparent clay thin film/support with a thickness of approximately 70 µm. The water permeation coefficient of this clay thin film was measured and found to be $2=10^{-10}$ cm/sec, meaning that good water blocking was exhibited.

EXAMPLE 48

60 cc of distilled water was added to 1.0 g of Kunipia P (as the clay; a natural montmorillonite made by Kunimine Industries), and this was put into a sealed plastic vessel along with a Teflon® agitator and shaken vigorously, which gave a uniform clay dispersion. This clay dispersion was poured into a flat-bottomed brass support that had a circular bottom measuring about 15 cm in diameter, and the dispersion was allowed to stand horizontally so that the clay particles would gradually settle. With the support held horizontal, the dispersion was dried for 5 hours at a temperature of 50° C. in a forced air oven, which gave a semi-transparent, circular clay thin film/support with a thickness of approximately 70 µm.

The helium, hydrogen, oxygen, nitrogen, and air permeation coefficients of this film were measured with a Gasperm-100 made by JASCO. The gas permeation coefficients for helium, hydrogen, oxygen, nitrogen, and air at room temperature were confirmed to be less than $3.2\times10^{-11}$ $cm^2s^{-1}cmHg^{-1}$, which tells us that the film exhibits gas barrier performance. Even after this composite thin film was heated for 24 hours at 1000° C., the gas permeation coefficients of the composite thin film for helium, hydrogen, oxygen, nitrogen, and air at room temperature were confirmed to be less than $3.2\times10^{-11}$ $cm^2s^{-1}cmHg^{-1}$, which tells us that the film exhibits gas barrier performance even after high-temperature treatment. The optical transmissivity of this film was measured with a U-3310 absorptiometer made by Hitachi. The optical transmissivity was measured by immersing the film in ethanol in a quartz rectangular cell and using light with a wavelength of 500 nm. As a result, the optical transmissivity was found to be 75%.

EXAMPLE 49

60 cc of distilled water was added to 0.95 g of Smectone (as the clay; a synthetic saponite made by Kunimine Industries), and this was put into a sealed plastic vessel along with a Teflon® agitator and shaken vigorously, which gave a uniform dispersion. This dispersion was poured onto a flat-bottomed support in the form of a metal (brass) sheet that had a circular bottom measuring about 15 cm in diameter, and the dispersion was allowed to stand horizontally so that the clay particles would gradually settle. With the support held horizontal, the dispersion was dried for 5 hours at a temperature of 50° C. in a forced air oven, which gave a semi-transparent, circular clay thin film/support with a thickness of approximately 30 µm. Observation by electron microscope revealed that the metal sheet and the clay thin film interfaces were in contact, with no gap in between, so the film did not peel away when merely touched by hand.

EXAMPLE 50

60 cc of distilled water was added to 1.0 g of Kunipia P (as the clay; a natural montmorillonite made by Kunimine Industries), and this was put into a sealed plastic vessel along with a Teflon® agitator and shaken vigorously for 30 minutes at 25° C., which gave a uniform dispersion. This dispersion was gradually dried at a temperature of 50° C., which gave a clay paste with a solid/liquid ratio of about 6 wt %. A brass tray was then coated with this clay paste. A stainless steel spreader blade was used for this coating. A spacer was used as a guide to form a clay paste film of uniform thickness. The thickness of the paste here was 0.3 mm.

This tray was put in a forced air oven and the film was dried for 20 minutes at a temperature of 50° C., which gave a semi-transparent, uniform, additive-containing composite clay thin film with a thickness of approximately 10 µm. The clay film thus produced was peeled from the tray, which gave a self-supporting clay film with excellent flexibility. The air permeation coefficient of this clay film was measured with a Gasperm-100 made by JASCO. As a result, the air permeation coefficient at room temperature was confirmed to be less than $3.2\times10^{-11}$ $cm^2s^{-1}cmHg^{-1}$, which tells us that the film exhibits gas barrier performance.

EXAMPLE 51

60 cc of distilled water was added to 0.90 g of natural montmorillonite (as the clay; Kunipia P made by Kunimine Industries), and this was put into a sealed plastic vessel along with a Teflon® agitator and shaken vigorously for 30 minutes at 25° C., which gave a uniform dispersion. To this dispersion was added 0.10 g of epsilon-caprolactam (as an additive; made by Wako Pure Chemical Industries), which gave a dispersion containing natural montmorillonite and epsilon-caprolactam. Next, the dispersion containing natural montmorillonite and epsilon-caprolactam was gradually dried at a temperature of 50° C., which gave a clay paste with a solid/liquid ratio of about 6 wt %. A brass tray was then coated with this clay paste. A stainless steel spreader blade was used for this coating. A spacer was used as a guide to form a clay paste film of uniform thickness. The thickness of the paste here was 0.06 mm. This tray was put in a forced air oven and the film was dried for 20 minutes at a temperature of 50° C., which gave a semi-transparent, uniform, additive-containing composite clay thin film with a thickness of approximately 2 µm. The clay film thus produced was peeled from the tray, which gave a self-supporting clay film with excellent flexibility.

EXAMPLE 52

60 cc of distilled water was added to 0.90 g of natural montmorillonite (as the clay; Kunipia P made by Kunimine Industries), and this was put into a sealed plastic vessel along with a Teflon® agitator and shaken vigorously for 30 minutes at 25° C., which gave a uniform dispersion. To this dispersion was added 0.10 g of epsilon-caprolactam (as an additive; made by Wako Pure Chemical Industries), which gave a dispersion containing natural montmorillonite and epsilon-caprolactam. Next, the dispersion containing natural montmorillonite and epsilon-caprolactam was gradually dried at a temperature of 50° C., which gave a clay paste with a solid/liquid ratio of about 6 wt %.

A brass tray was then coated with this clay paste. A stainless steel spreader blade was used for this coating. A spacer was used as a guide to form a clay paste film of uniform thickness. The thickness of the paste here was 0.3 mm. This tray was put in a forced air oven and the film was dried for 20 minutes at a temperature of 50° C., which gave a semi-transparent, uniform, additive-containing composite clay thin film with a thickness of approximately 10 µm. The clay film thus produced was peeled from the tray, which gave a self-supporting clay film with excellent flexibility. The air permeation coefficient of this clay film was measured with a Gasperm-100 made by JASCO. As a result, the air permeation coefficient at room temperature was confirmed to be less than $3.2 \times 10^{-11}$ $cm^2 s^{-1} cmHg^{-1}$, which tells us that the film exhibits gas barrier performance.

Comparative Example 4

60 cc of distilled water was added to 1 g of natural montmorillonite (as the clay; Kunipia P made by Kunimine Industries), and this was put into a sealed plastic vessel along with a Teflon® agitator and shaken vigorously for 30 minutes at 25° C., which gave a uniform dispersion. This dispersion was poured into a flat-bottomed brass tray that had a circular bottom measuring about 15 cm in diameter, and the dispersion was allowed to stand horizontally so that the clay particles would gradually settle. With the tray held horizontal, the dispersion was dried for 5 hours at a temperature of 50° C. in a forced air oven, which gave a uniform clay film with a thickness of approximately 30 µm. The clay film thus produced was peeled from the tray, which gave a self-supporting clay film with excellent flexibility.

INDUSTRIAL APPLICABILITY

The present invention provides a novel clay film that can be used as a self-supporting film, has excellent flexibility, is a solid material that is free of pinholes, has excellent barrier properties, and is useful as a chemical stable gasket material or the like that can be used under high temperature conditions over 350° C. The present invention also provides a film with the excellent heat resistance and barrier properties of clay, resulting from the clay particles being highly oriented. Because the clay film of the present invention can be used as a self-supporting film and has excellent heat resistance and flexibility, it can be used in a wide range of applications, such as filters and diaphragms. The clay film of the present invention can also be used for pipe sealing materials that block off gases, solutions, oils, and so forth, fuel sealants used around rocket and jet engines, fuel cell diaphragms, and so on. Also, with the present invention, the above-mentioned clay film can be manufactured by a simple process that does not generate waste liquid. Also, after the solvent has been removed and the clay film formed, it can be used as a protective film for a support, without first being peeled away from the support surface, and therefore serves to prevent the corrosion and fouling of a support and increase its heat resistance.

The invention claimed is:

1. A homogeneous clay film comprising:
   clay as a main component and one or more of an additive, or clay as a main component and one or more of an additive and a functional component, wherein the additive is one or more selected from the group consisting of epsilon-caprolactam, dextrin, chitosan, a starch, a cellulose resin, a gelatin, an agar-agar, a wheat flour, a gluten, an alkyd resin, a polyurethane resin, an epoxy resin, a fluororesin, an acrylic resin, a methacrylic resin, a phenol resin, a polyamide resin, a polyester resin, a polyimide resin, a polyvinyl resin, a polyethylene glycol, a polyacrylamide, a polyethylene oxide, a protein, a deoxyribonucleic acid, a ribonucleic acid, a polyamino acid, a phenol, and a benzoic acid, wherein the clay film has a structure in which layers of clay particles are highly oriented,
   wherein the clay film has enough mechanical strength and flexibility to be used as a self-supporting film,
   wherein the clay film contains no pinholes,
   wherein the clay film has a gas permeation coefficient of less than $3.2 \times 10^{-11}$ $cm^2 s^{-1}$ $cmHg^{-1}$ at room temperature for helium, hydrogen, oxygen, nitrogen, or air, and
   wherein the clay film has excellent flexibility, the weight loss over a temperature range of 200 to 600° C. in differential thermal analysis is less than 10%, the basic structure does not change, and no pinholes exist.

2. The clay film according to claim 1, wherein the main constituent component of the clay film is natural clay or synthetic clay.

3. The clay film according to claim 1, wherein the main constituent component of the clay film is one or more components selected from the group comprising mica, vermiculite, montmorillonite, iron montmorillonite, beidellite, saponite, hectorite, stevensite, and nontronite.

4. The clay film according to claim 1, wherein the functional component is an enzyme, polyhydric phenol, or nylon.

5. The clay film according to claim 1, wherein the clay film comprises one or more of hydroquinone, resorcin, pyrocatechol, and phloroglucin.

6. The clay film according to claim 1, which has any two-dimensional planar shape, typified by circular, square, or rectangular, or any three-dimensional planar shape that is a flat plate, tube, circular column, cone, sphere, or a combination thereof, and which can be used as a self-supporting film.

7. The clay film according to claim 1, wherein the thickness of the clay film is less than 1 mm and the surface area is greater than 1 $cm^2$.

8. The clay film according to claim 1, wherein the weight proportion of the additive versus the total solids is not more than 30%.

9. The clay film according to claim 1, wherein the weight proportion of the functional component versus the total solids is not more than 30%.

10. The clay film according to claim 1, wherein the weight proportion of the main component clay versus the total solids is at least 90%.

11. The clay film according to claim 1, wherein the gas permeation coefficient is less than $3.2 \times 10^{-11}$ $cm^2 s^{-1}$ $cmHg^{-1}$ at room temperature for helium, hydrogen, oxygen, nitrogen, or air after 24 hours of heat treatment at 600° C.

12. The clay film according to claim 1, wherein the water permeation coefficient is not more than $2 \times 10^{-10}$ cm s$^{-1}$ at room temperature.

13. The clay film according to claim 1, wherein the gas barrier property or the mechanical strength is improved by conducting a chemical reaction of an addition reaction, condensation reaction, or polymerization reaction by any method of heating or optical irradiation, and producing new chemical bonds between the clay, the additive, and the functional component, or within the components.

14. The clay film according to claim 1, wherein the clay film has a transmissivity of light with a wavelength of 500 nm of at least 75%.

15. A member with high barrier properties, made from the clay film according to any one of claims 1-3 or 4-14.

16. A protective film, made of the clay film according to any one of claims 1-3 or 4-14.

17. A gas blocking material, made from the clay film according to any of one of claims 1-3 or 4-14.

18. The clay film according to claim 1, comprising at least one organic additive.

19. The clay film according to claim 1, wherein the clay film consists of the clay, the additive and the functional component.

20. The clay film according to claim 1, wherein the clay film comprises the clay, the additive and the functional component.

21. The clay film according to claim 1, wherein the clay is a montmorillonite.

22. A homogeneous clay film consisting of:
clay as a main component and at least one additive selected from the group consisting of epsilon-caprolactam, dextrin, chitosan, starch, a cellulose resin, gelatin, agar-agar, a wheat flour, gluten, an alkyd resin, a polyurethane resin, an epoxy resin, a fluororesin, an acrylic resin, a methacrylic resin, a phenol resin, a polyamide resin, a polyester resin, a polyimide resin, a polyethylene glycol, a polyacrylamide, a polyethylene oxide, a protein, a deoxyribonucleic acid, a ribonucleic acid, a polyamino acid, a phenol, and a benzoic acid,
wherein the clay film has a structure in which layers of clay particles are highly oriented,
wherein the clay film has enough mechanical strength and flexibility to be used as a self-supporting film,
wherein the clay film contains no pinholes,
wherein the clay film has a gas permeation coefficient of less than $3.2 \times 10^{-11}$ cm$^2$s$^{-1}$ cmHg$^{-1}$ at room temperature for helium, hydrogen, oxygen, nitrogen, or air, and
wherein the clay film has excellent flexibility, the weight loss over a temperature range of 200 to 600° C. in differential thermal analysis is less than 10%, the basic structure does not change, and no pinholes exist.

23. A homogeneous clay film consisting of:
clay as a main component and one or more of an additive and at least one functional component selected from the group consisting of an enzyme, a polyhydric phenol, and a nylon,
wherein the clay film has a structure in which layers of clay particles are highly oriented,
wherein the clay film has enough mechanical strength and flexibility to be used as a self-supporting film,
wherein the clay film contains no pinholes,
wherein the clay film has a gas permeation coefficient of less than $3.2 \times 10^{-11}$ cm$^2$s$^{-1}$ cmHg$^{-1}$ at room temperature for helium, hydrogen, oxygen, nitrogen, or air, and
wherein the clay film has excellent flexibility, the weight loss over a temperature range of 200 to 600° C. in differential thermal analysis is less than 10%, the basic structure does not change, and no pinholes exist.

* * * * *